US009877439B1

(12) United States Patent
McHugh

(10) Patent No.: US 9,877,439 B1
(45) Date of Patent: Jan. 30, 2018

(54) IRRIGATION SYSTEM, COMPONENTS, AND METHOD OF THEIR USE

(71) Applicant: John A. McHugh, Loveland, CO (US)

(72) Inventor: John A. McHugh, Loveland, CO (US)

( * ) Notice: Subject to any disclaimer, the term of this patent is extended or adjusted under 35 U.S.C. 154(b) by 134 days.

(21) Appl. No.: 14/628,220

(22) Filed: Feb. 21, 2015

Related U.S. Application Data

(60) Provisional application No. 61/952,712, filed on Mar. 13, 2014.

(51) Int. Cl.
*A01G 25/02* (2006.01)
*B05B 15/10* (2006.01)

(52) U.S. Cl.
CPC .............. *A01G 25/02* (2013.01); *B05B 15/10* (2013.01)

(58) Field of Classification Search
CPC ................................ A01G 25/02; B05B 15/10
USPC ....................... 239/1, 195–198; 138/118–119
See application file for complete search history.

(56) References Cited

U.S. PATENT DOCUMENTS

| 717,042 | A | * | 12/1902 | Smith | ........................ | B05B 1/14 |
| | | | | | | 239/280 |
| 1,910,765 | A | * | 5/1933 | Hanlan | ................. | B05B 1/3415 |
| | | | | | | 239/267 |
| 2,563,300 | A | | 8/1951 | Aker | | |
| 3,588,012 | A | * | 6/1971 | Schaefer | ................ | A01G 25/02 |
| | | | | | | 239/276 |
| 3,843,059 | A | * | 10/1974 | Segev | ................... | B05B 15/063 |
| | | | | | | 239/273 |
| 3,856,208 | A | * | 12/1974 | Naftaly | ................. | B05B 15/065 |
| | | | | | | 239/251 |
| 3,899,132 | A | | 8/1975 | Grobbelaar | | |
| 4,275,839 | A | * | 6/1981 | Olson | ................... | B05B 15/063 |
| | | | | | | 239/272 |
| 4,402,631 | A | | 9/1983 | Rosenthal | | |
| 4,445,643 | A | | 5/1984 | Thorsby et al. | | |
| 4,655,399 | A | | 4/1987 | Harvey | | |
| 4,830,283 | A | * | 5/1989 | Johnson | ............... | A01G 25/095 |
| | | | | | | 137/355.2 |
| 6,601,775 | B2 | | 8/2003 | Kirk | | |
| 8,672,240 | B2 | | 3/2014 | Masarwa et al. | | |
| 2014/0021273 | A1 | * | 1/2014 | Turk | ...................... | A01G 25/02 |
| | | | | | | 239/542 |

FOREIGN PATENT DOCUMENTS

EP              0190792 B1     8/1986

* cited by examiner

*Primary Examiner* — Arthur O Hall
*Assistant Examiner* — Chee-Chong Lee
(74) *Attorney, Agent, or Firm* — Brian C. Trask

(57) ABSTRACT

This invention provides a method for irrigating an area by providing a fluid conduit coiled on a spool. The conduit includes a plurality of sprinkler ports disposed spaced apart along a length axis of the conduit. Each sprinkler port has an affixed connection structure operable to removably connect, removably quick-connect, or quick-deploy a riser, and a portion of that connection structure is disposed inside the hydraulic cross-section of the conduit. The method includes uncoiling a length of the conduit to dispose that uncoiled length of conduit as a line across the area to be irrigated. The uncoiled conduit may then be used to irrigate the area as desired. When finished, the length of conduit may be removed from the irrigation area by again coiling it onto a spool.

19 Claims, 30 Drawing Sheets

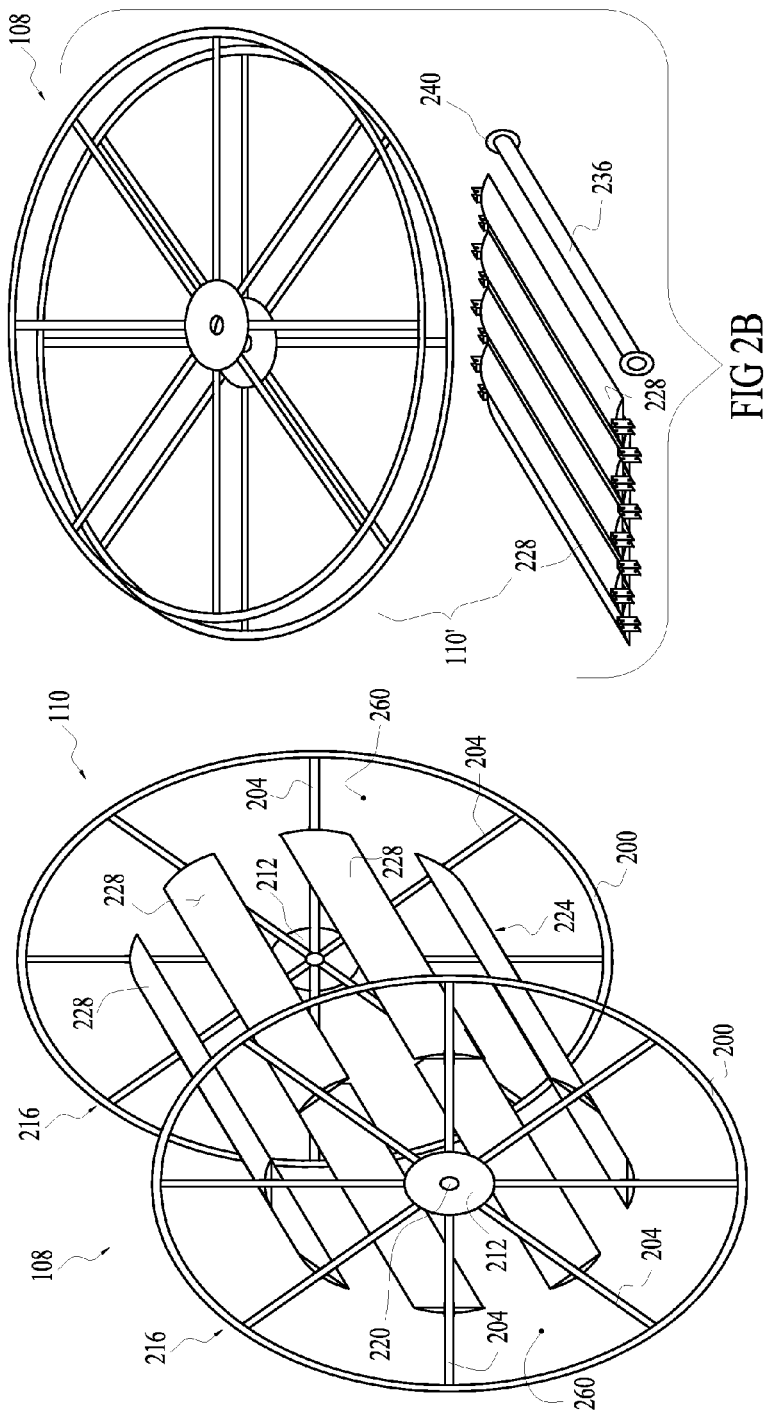
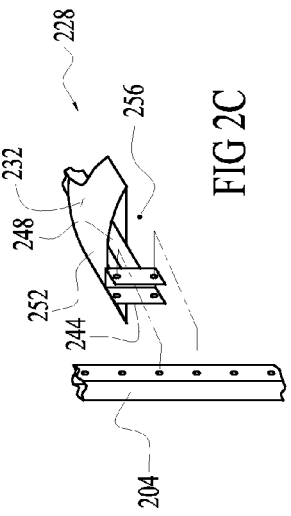
FIG 2B
FIG 2C
FIG 2A

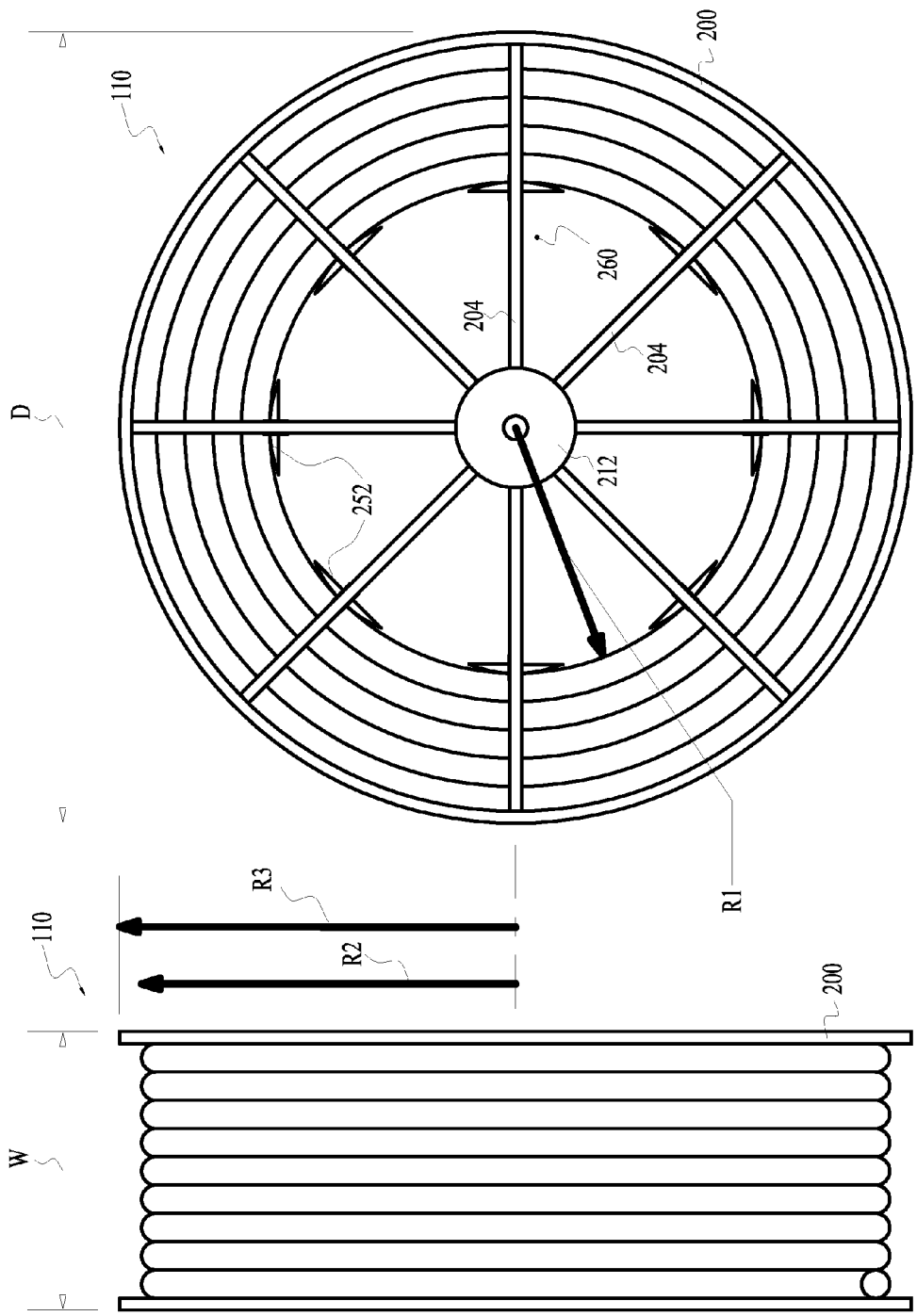

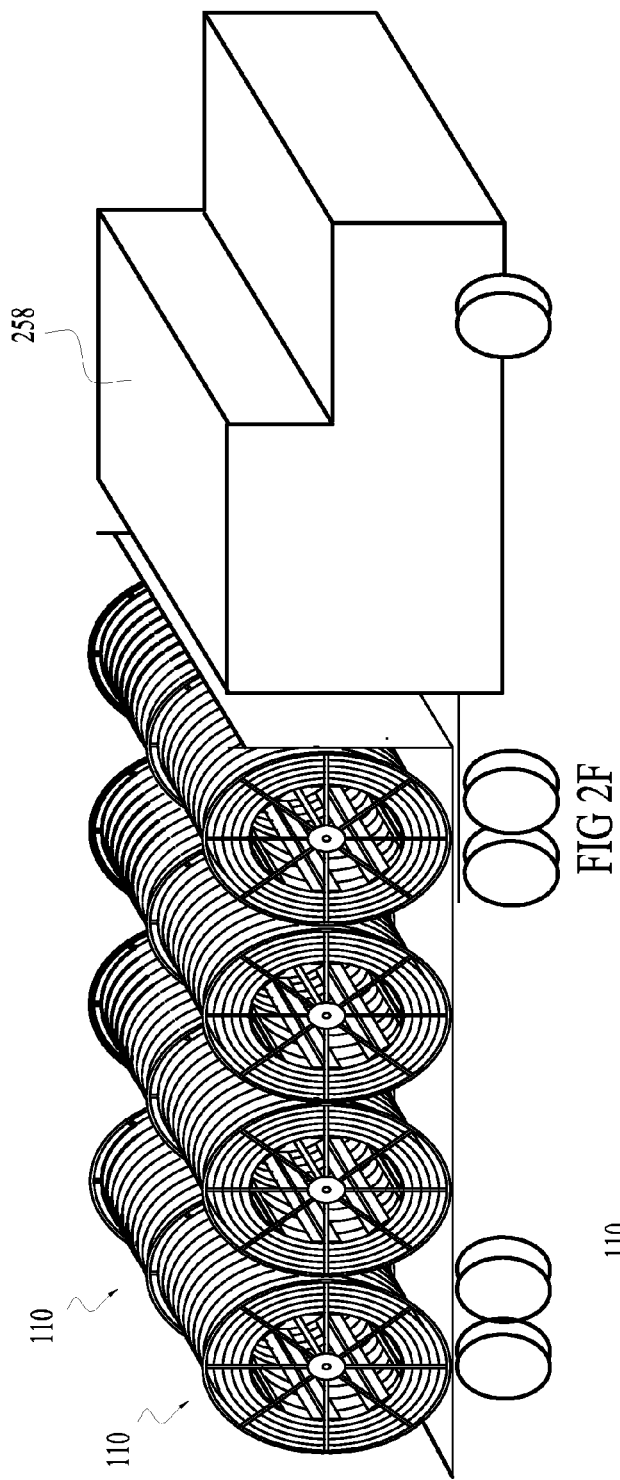
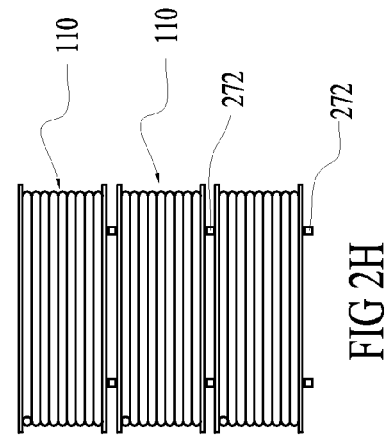
FIG 2H
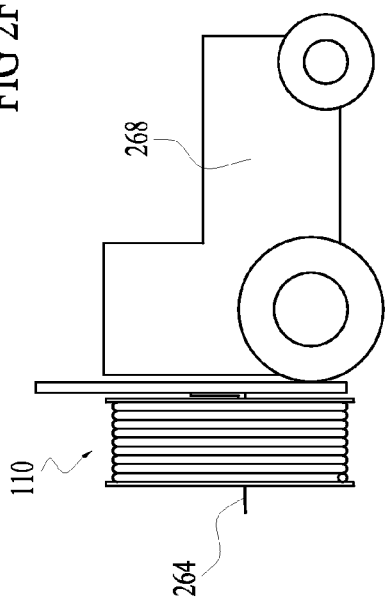
FIG 2G
FIG 2F

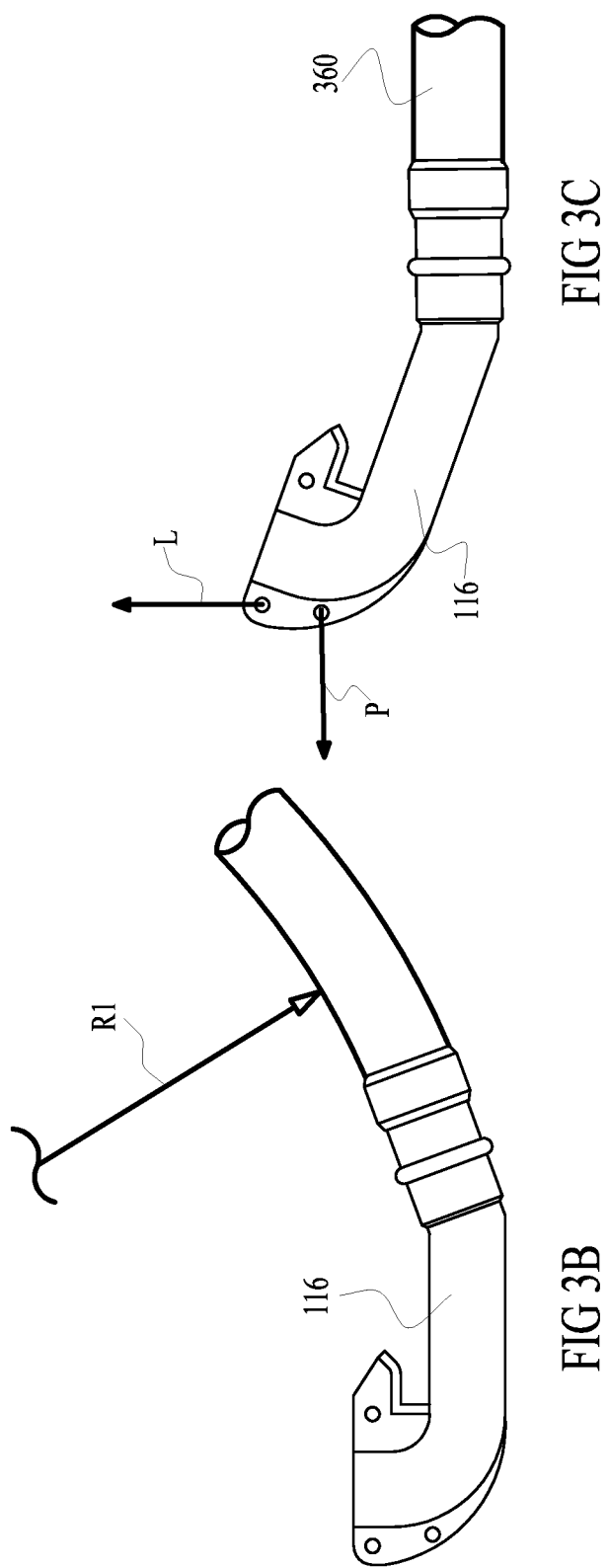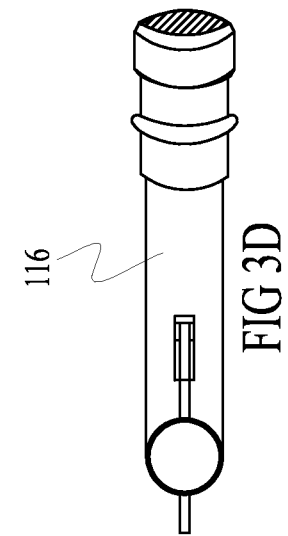
FIG 3C
FIG 3D
FIG 3B

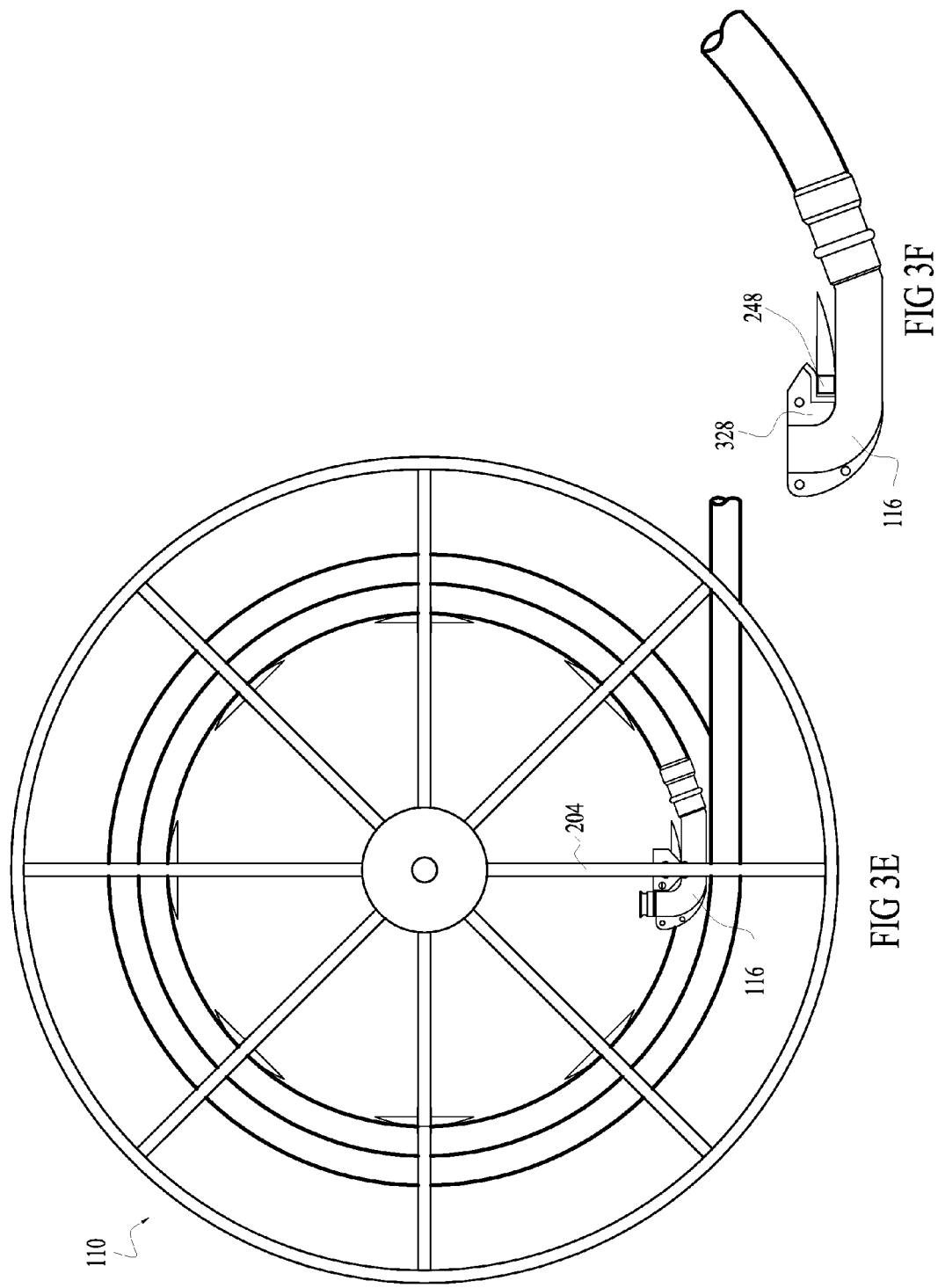

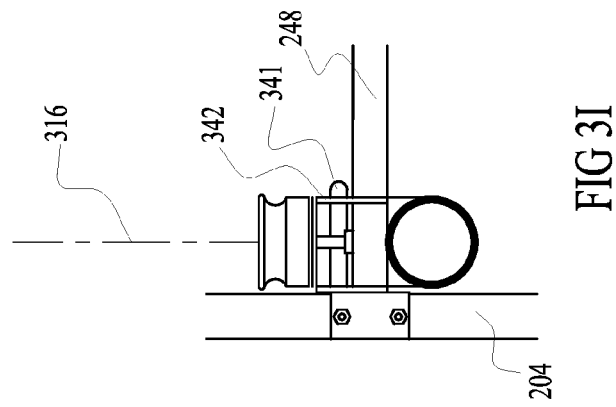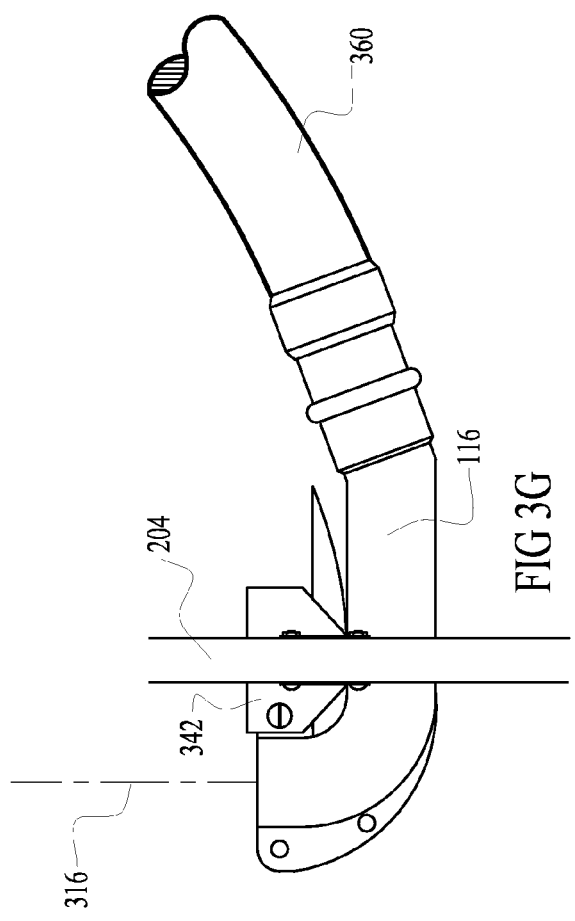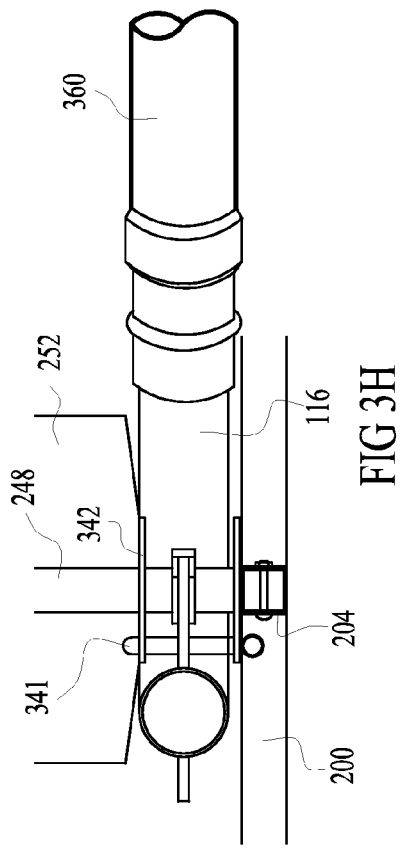

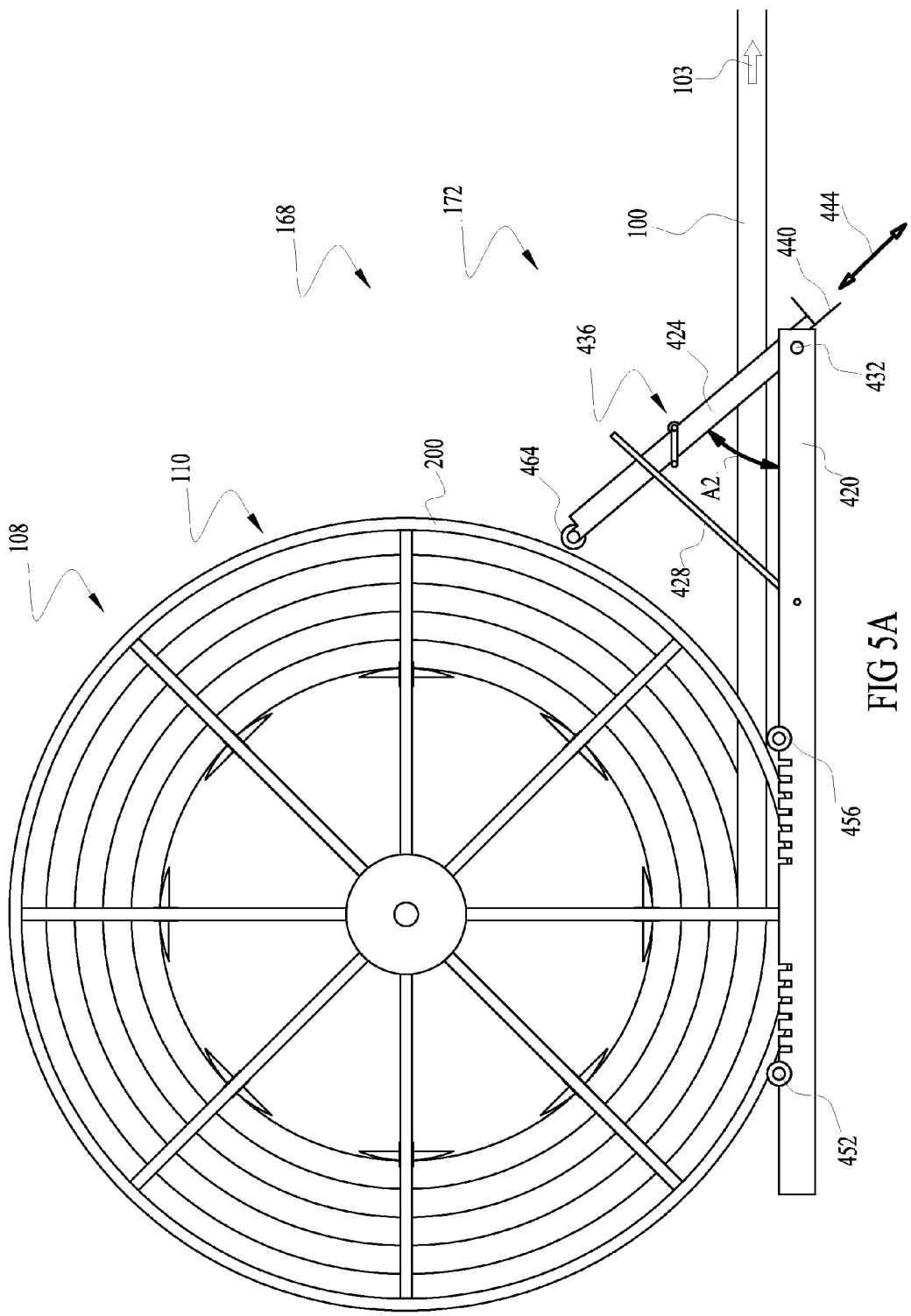

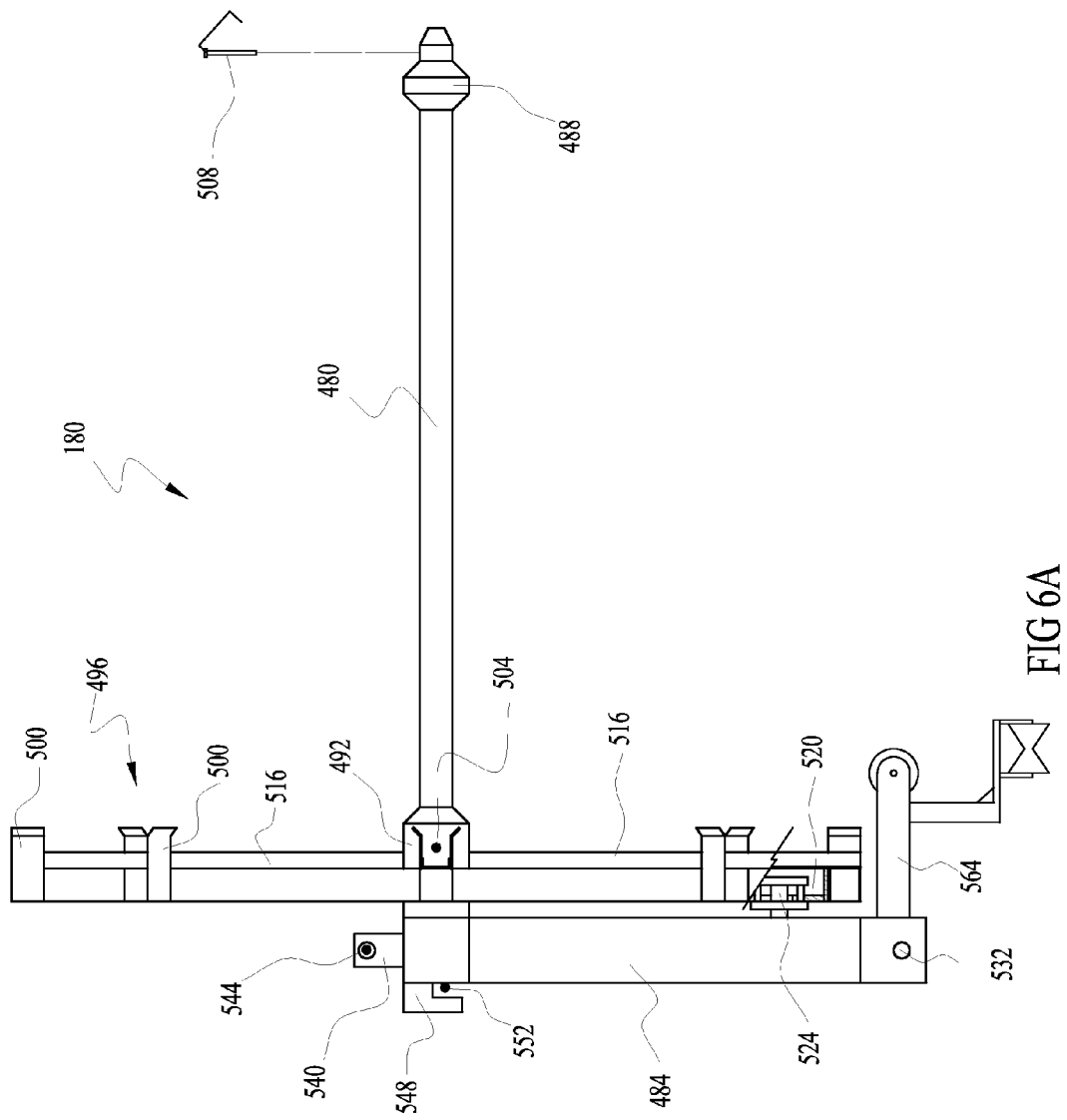

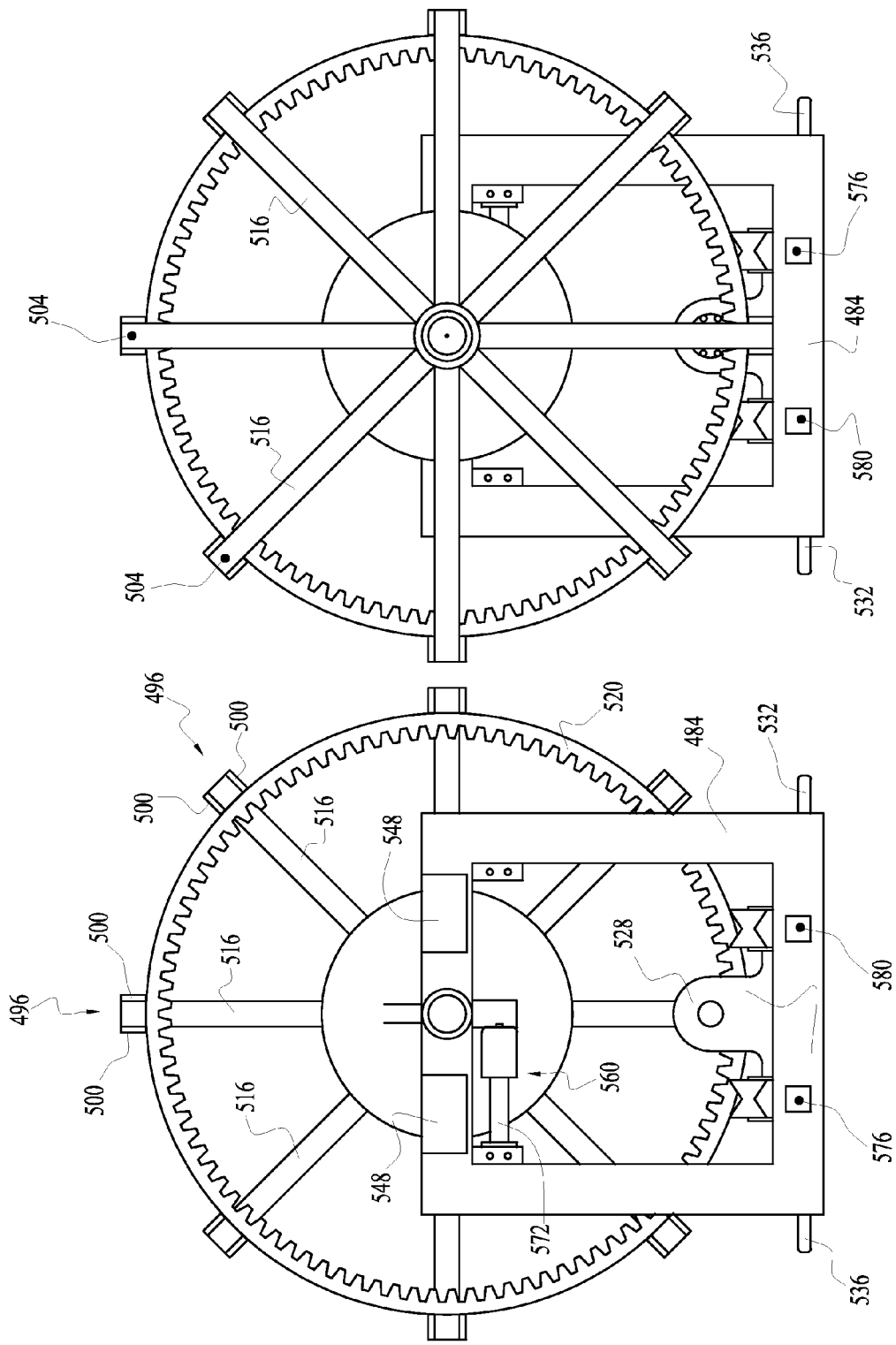

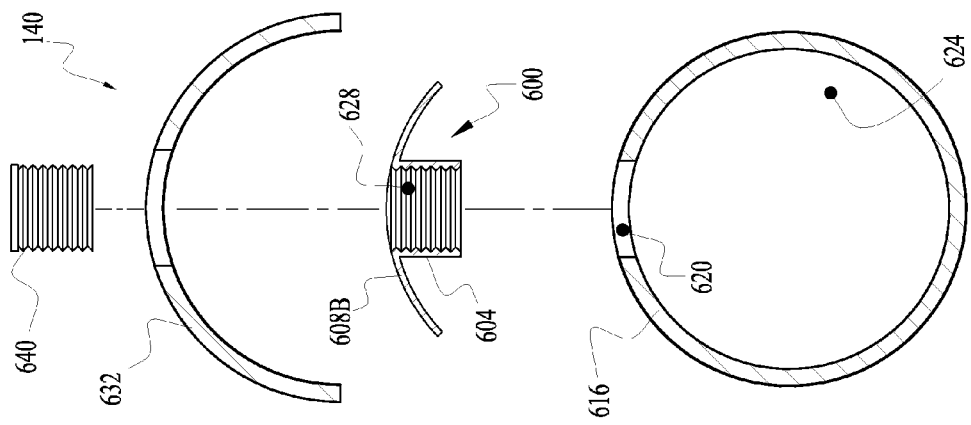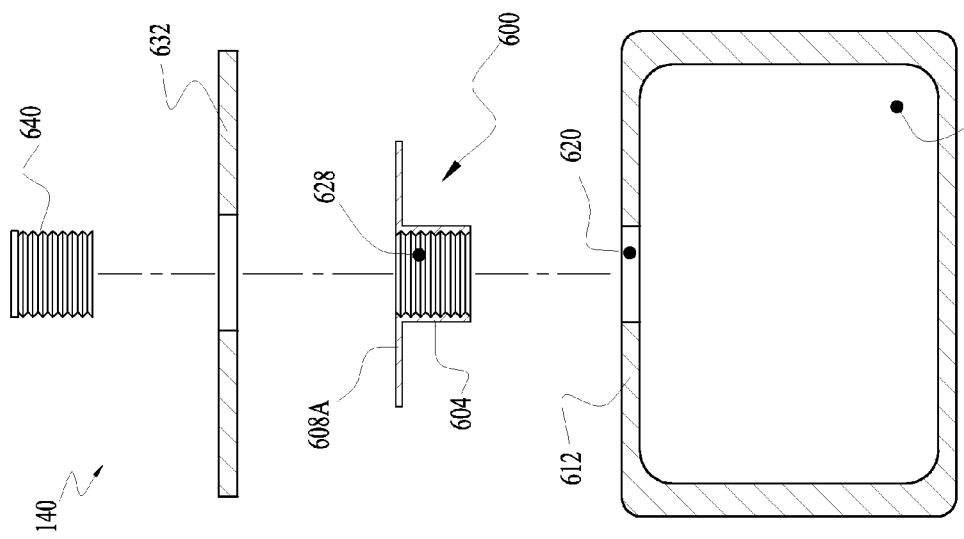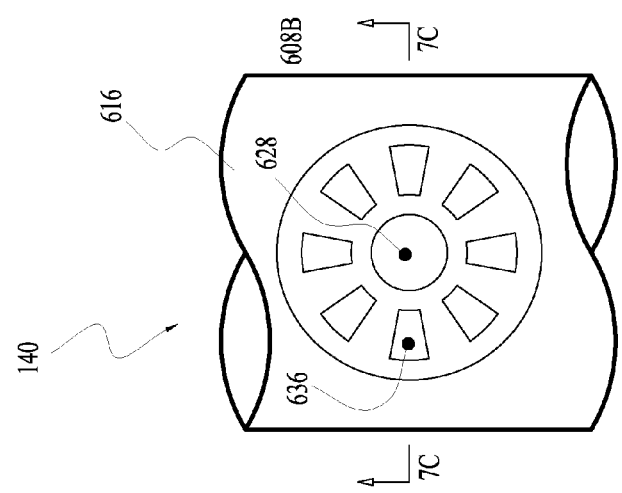

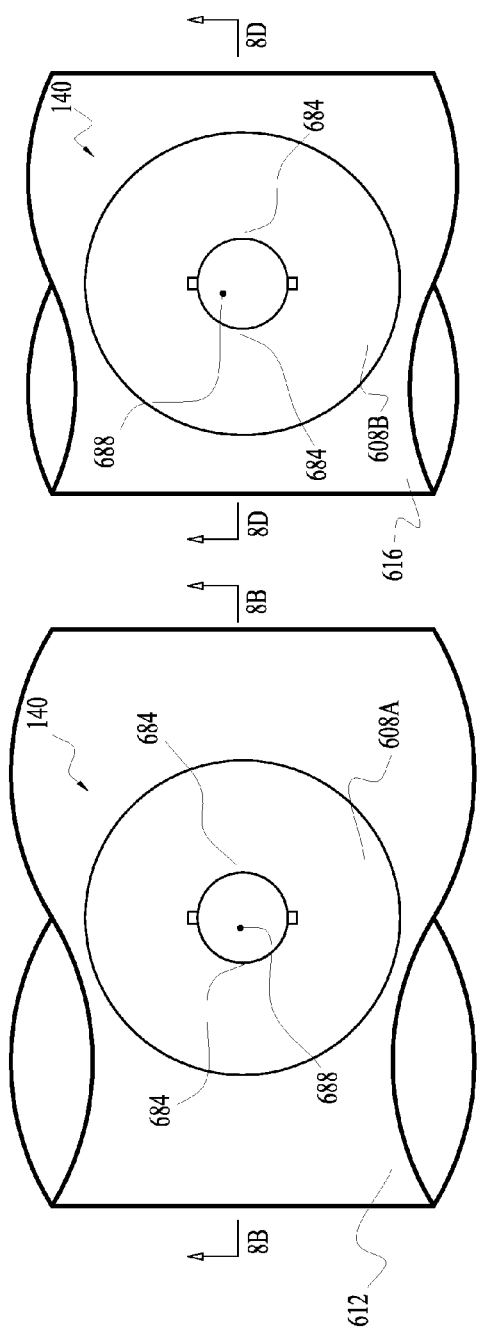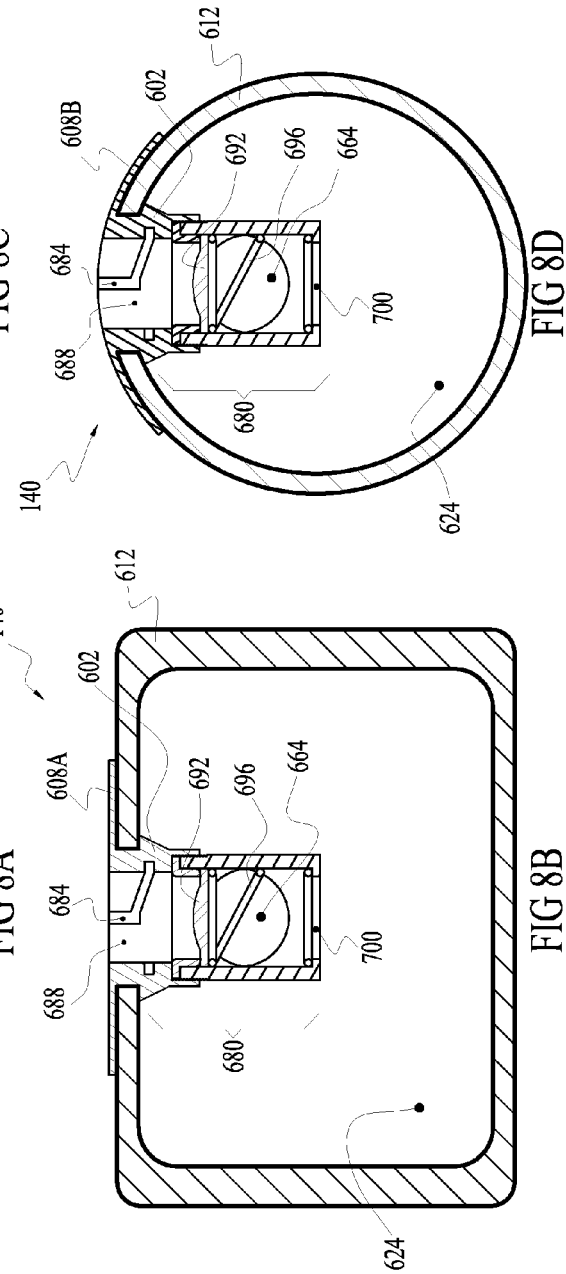

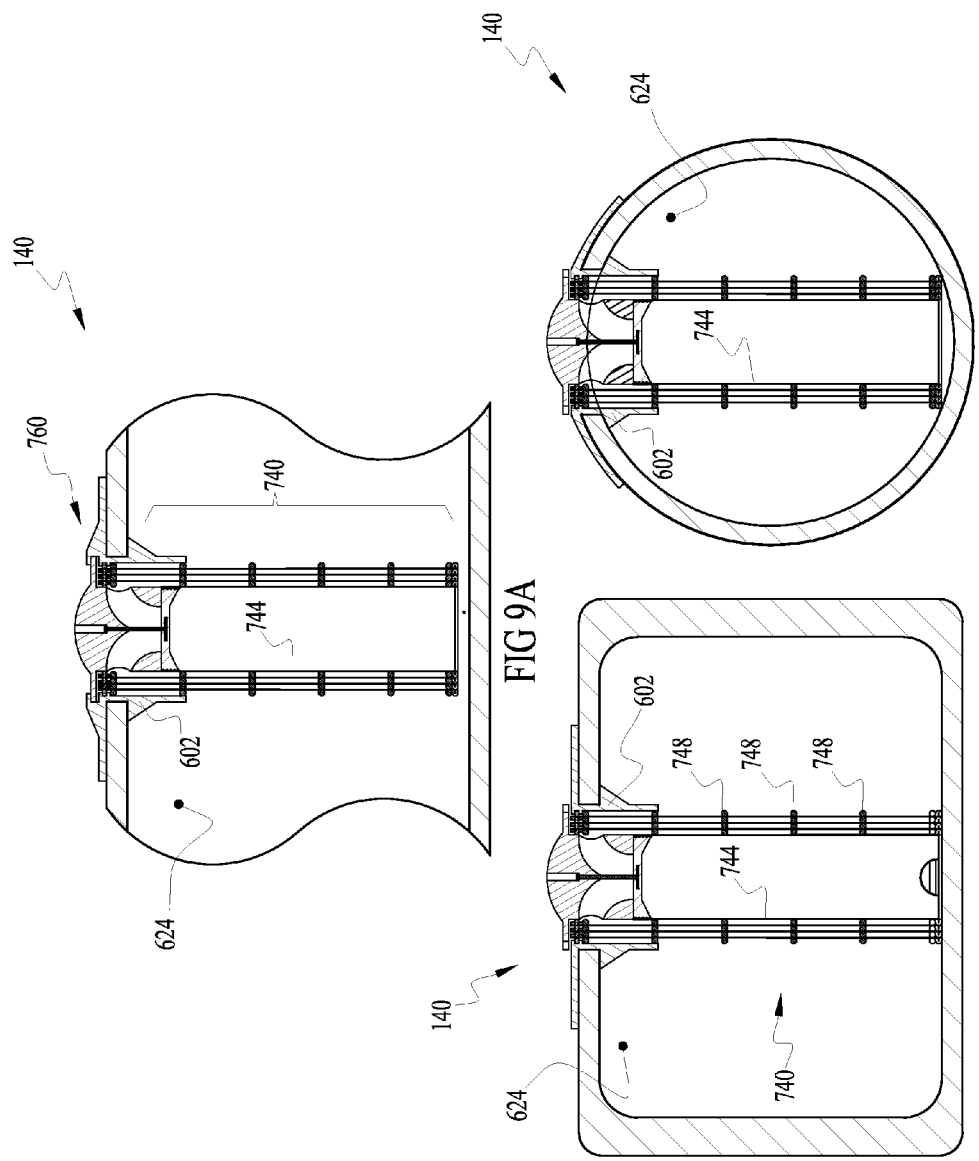

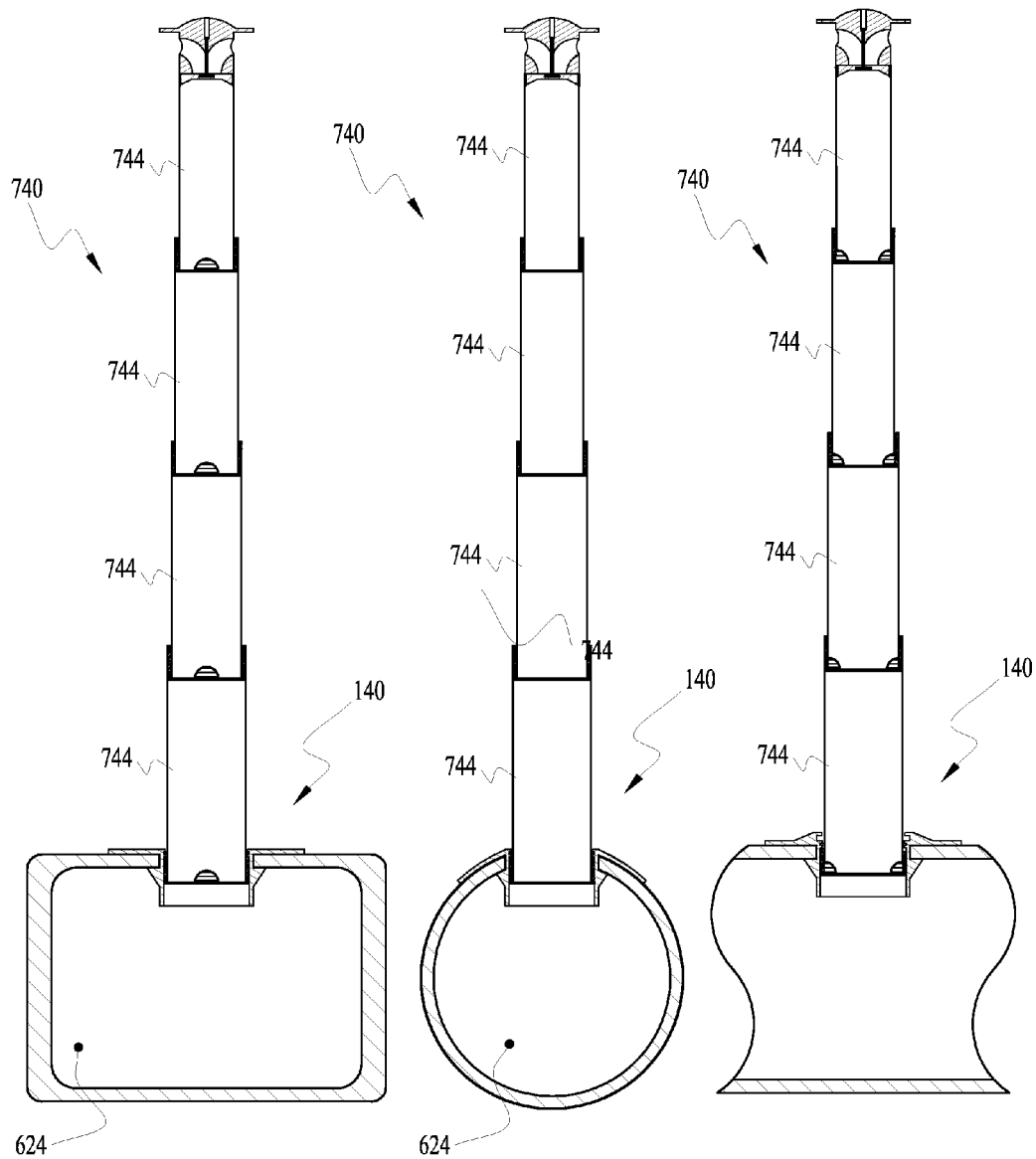

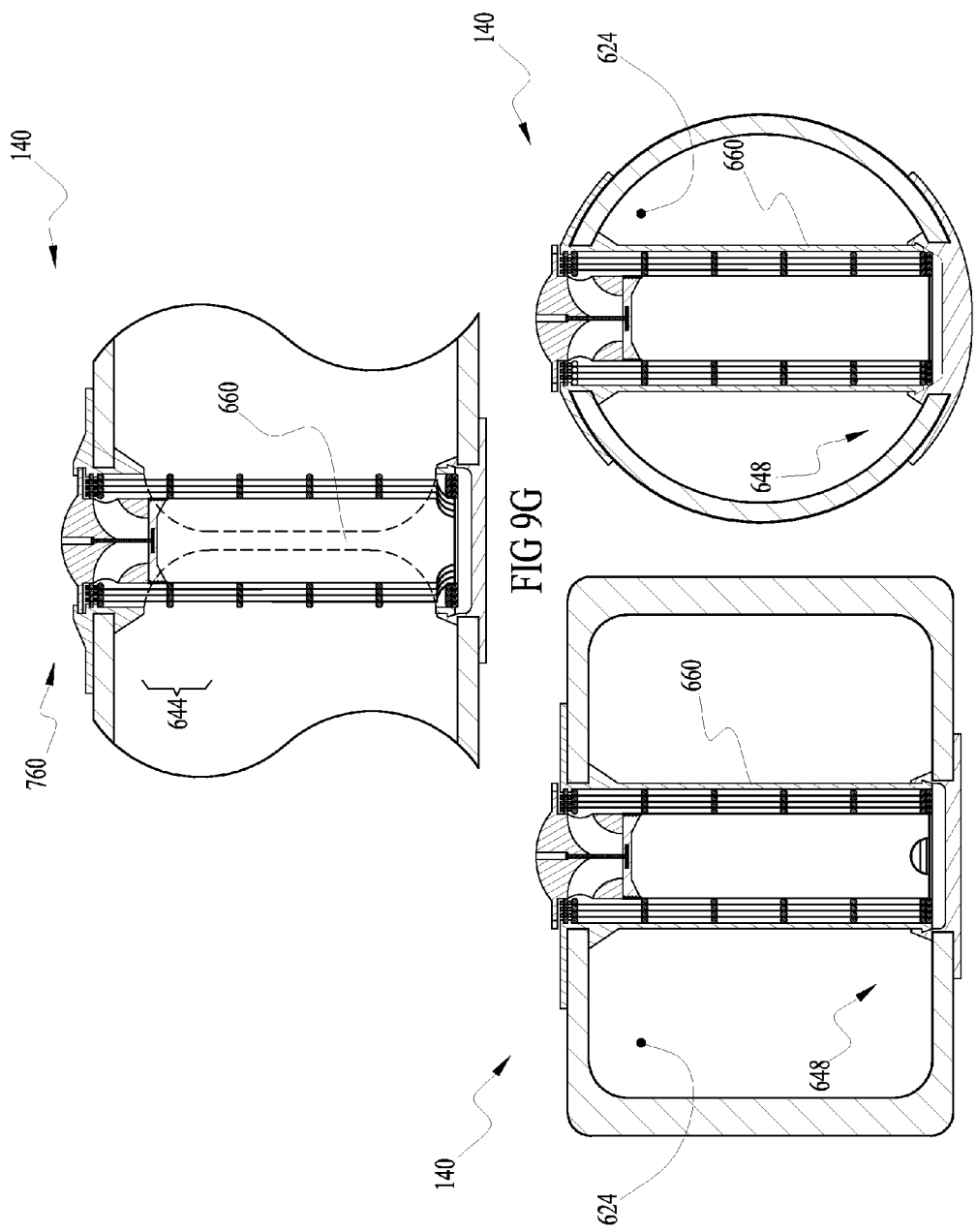

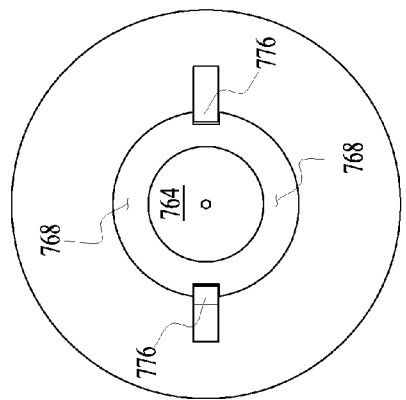
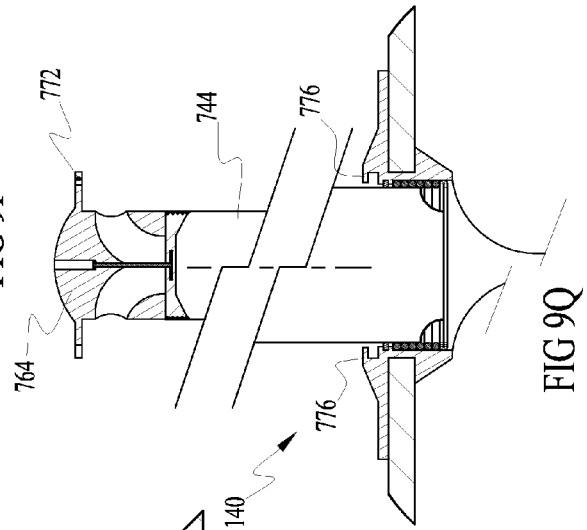
FIG 9P
FIG 9Q
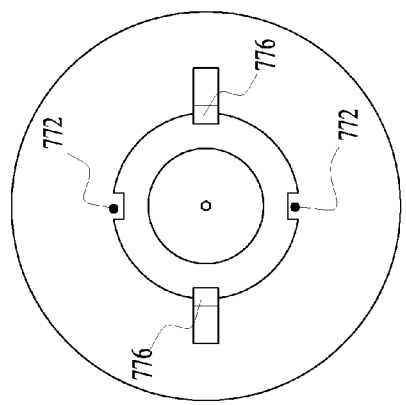
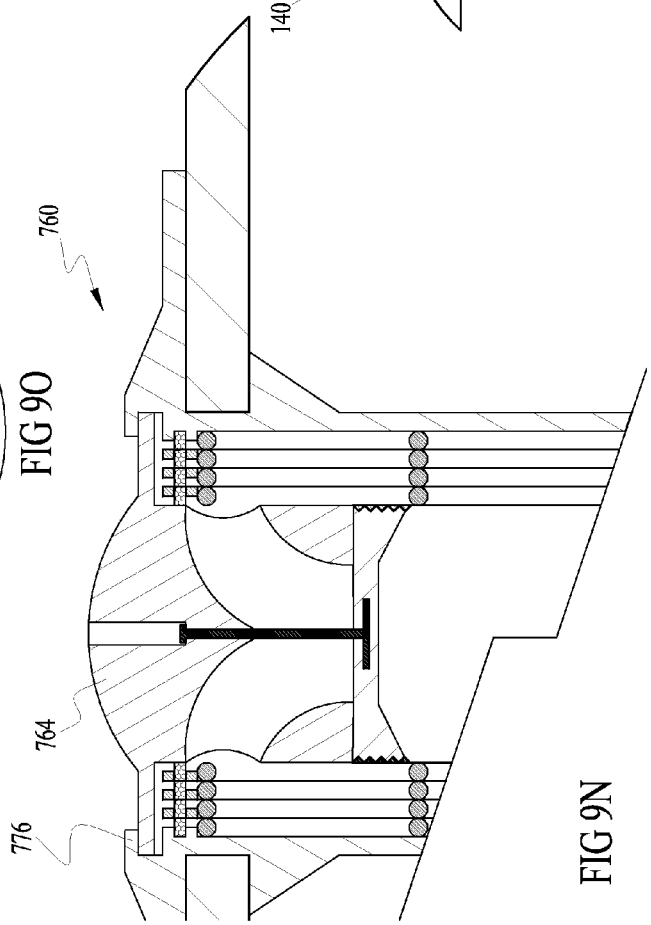
FIG 9O
FIG 9N

IRRIGATION SYSTEM, COMPONENTS, AND METHOD OF THEIR USE

RELATED APPLICATIONS

This application claims the benefit under 35 U.S.C. 119(e) of the filing date of Provisional Application Ser. No. 61/952,712, filed Mar. 13, 2014, for "CROSS CHANNEL STABILIZER", the entire contents of which are hereby incorporated by reference as though set forth herein in their entirety.

BACKGROUND

Field of the Invention

This invention relates generally to plumbing structures and methods to control flow of fluids. It is particularly directed to an improved crop irrigation system.

State of the Art

Irrigation has been practiced for a very long time. Irrigation has many applications, including as non-limiting examples: watering areas of land on which to grow crops; spreading water or fluid mixtures over mining heaps; controlling dust in construction sites; fire suppression; and the like. Irrigation systems have evolved from diversion channels for simple flood-irrigation to include more complicated systems having pressurized fluid supply conduits that feed localized fluid emitters. Typically, it is desired for the irrigation system to provide controlled and relatively uniform application of water, or other fluid, over an area. It is generally desirable for the irrigation system to be low-cost and easy to deploy. In some cases, it is further desirable for a portion of the irrigation system to be easily removed from the area of its deployment, stored, and redeployed at a future time. In any case, it would be very desirable to minimize the amount of labor required to deploy, and/or to retrieve, an irrigation system.

Exemplary structures used for irrigation, and methods of use of those structures, are disclosed in the patent literature, including U.S. Pat. Nos. 2,563,300; 3,899,132; 4,402,631; 4,445,643; 4,655,399; 4,830,283; 6,601,775; and 8,672,240. Another relevant disclosure is made by European patent No. EP1090792. The entire disclosures of all patent documents identified in this paragraph are hereby incorporated by reference as a part of this disclosure, as though set forth herein in their entirety.

BRIEF SUMMARY OF THE INVENTION

This invention provides a method for irrigating an area by providing a fluid conduit coiled on a spool. The conduit includes a plurality of sprinkler ports disposed spaced apart along a length axis of the conduit. Each sprinkler port has an affixed connection structure operable to removably connect, removably quick-connect, or quick-deploy a riser, and a portion of that connection structure is disposed inside the hydraulic cross-section of the conduit. The method includes uncoiling a length of the conduit to dispose that uncoiled length of conduit as a line across the area to be irrigated. The uncoiled conduit may then be used to irrigate the area as desired. When finished, the length of conduit may be removed from the irrigation area by coiling it onto a spool. The spooled-up conduit can then be moved for storage, and permit re-deployment of the conduit to irrigate an area. A benefit of the invention is that labor to deploy and/or retrieve the length of conduit (and an attendant sprinkling system) is greatly reduced compared to conventional use of a plurality of lengths of rigid conduit segments that are coupled end-to-end during deployment for irrigation.

Sometimes, each sprinkler port in a conduit comprises a quick-connect valve disposed inside the hydraulic cross-section. In that case, the internal quick-connect valve is typically structured to operate as a normally-closed check valve.

Sometimes, each sprinkler port in a conduit comprises a pop-up riser, with a portion of the pop-up riser being biased for disposition inside the hydraulic cross-section of the conduit. Desirably, at least one pop-up riser further includes valve structure operable to resist discharge of fluid therethrough to permit control of fluid flow through its associated sprinkler port.

Sometimes, each sprinkler port in a conduit comprises an affixed threaded socket structured to couple with an end of a threaded riser. In that case, a portion of the threaded socket protrudes into the hydraulic cross-section of the conduit. In contrast, an exemplary conventional T fitting is structured to dispose the orthogonal T-leg (and any connection structure that it carries) outside of the hydraulic cross-section of the through-leg.

Desirably, structure effective to locally reinforce each sprinkler port is configured to protrude above the surface of the conduit by less than about the thickness of the conduit wall. It is preferred that local reinforcement structure for each sprinkler port is configured to protrude above the surface of the conduit by less than about ⅛ inch.

In an exemplary embodiment, the cross-section of the conduit is structured to automatically align the plurality of sprinkler ports for discharge through associated risers in a substantially common vertical direction upon deployment of the length of conduit. Optionally, each sprinkler port may be associated with a cross-channel stabilizer. Cross-channel stabilizers can further assist in causing alignment of risers.

The invention may be practiced by disposing a spool at an edge of the area and on a rolling support structured to engage rim portions of the spool to permit unspooling a length of conduit from the spool. A free end of the conduit can then be dragged to unspool the length of conduit from the spool and dispose the length of conduit in the field. Sometimes, deployment and/or retrieval may include coupling a winding apparatus to the spool. During retrieval, the winding apparatus may be employed to wind up conduit onto the spool to retrieve the length of conduit from the area. Conventionally, the winding apparatus remains at an edge of the area while winding conduit onto the spool. However, it is within contemplation that the winding apparatus can travel across the area while winding conduit onto the spool.

The invention may be embodied as a method for irrigating an area, starting with providing a fluid conduit coiled on a spool. The conduit includes a plurality of sprinkler ports disposed spaced apart along a length axis of the conduit. Each sprinkler port can include a quick-connect structure, desirably having a normally-closed valve. An exemplary quick-connect structure is configured to couple with a key operable to permit fluid flow toward a fluid emitter. In embodiments of this quick-connect type, a wetted portion of the quick-connect structure is disposed inside the hydraulic cross-section of the conduit. Sometimes, each sprinkler port is associated with a cross-channel stabilizer. Desirably, the quick-connect structure includes a pair of oppositely-disposed side wall openings structured to permit hydrodynamic flow-through during sprinkler operation. The method includes deploying a length of the conduit to dispose the length of conduit as a line across the area. Then, the conduit may be used to irrigate the area as desired.

The invention may be embodied as a method for irrigating an area, starting with providing a fluid conduit coiled on a spool. This time, the conduit includes a plurality of sprinkler ports disposed spaced apart along a length axis of the conduit, but each sprinkler port is associated with a pop-up riser. Further, a portion of the pop-up riser is normally disposed inside the hydraulic cross-section of the conduit. Sometimes, each sprinkler port is associated with a cross-channel stabilizer. A preferred cross-channel stabilizer includes a pair of oppositely-disposed side wall openings structured to permit hydrodynamic flow-through during sprinkler operation. The method includes deploying a length of the conduit as a line across the area. And again, the conduit may be used to irrigate the area as desired.

BRIEF DESCRIPTION OF THE DRAWINGS

In the drawings, which illustrate what are currently considered to be the best modes for carrying out the invention:

FIGS. 2A through 2H illustrate details of a preferred storage device;

FIGS. 3A through 3I illustrate details of a preferred pull hook adapter;

FIGS. 5A through 5C illustrate details of preferred support structures that permit unspooling stored conduit from a storage device;

FIGS. 6A through 6G illustrate details of a motor winch apparatus that can support a conduit storage device either to permit unspooling from, or to assist in spooling conduit onto, that storage device;

FIGS. 7A through 7F illustrate details of a first preferred arrangement for coupling a riser to a fluid delivery conduit;

FIGS. 8A through 8L illustrate details of a second preferred arrangement for coupling a riser to a fluid delivery conduit.

DETAILED DESCRIPTION OF THE ILLUSTRATED EMBODIMENTS

Reference will now be made to the drawings in which the various elements of the illustrated embodiments will be given numerical designations and in which the invention will be discussed so as to enable one skilled in the art to make and use the invention. Similar structures in different FIGs. are generally given the same numeral, to avoid undue repetition. Views illustrated in certain FIGs. are denoted by similarly numbered section arrows in other FIGs., in accordance with conventional practice. Certain views of different embodiments are taken from the same perspective, and similarity is believed self-evident. It is to be understood that the following description is only exemplary of certain principles of the present invention, and should not be viewed as narrowing the claims which follow.

Figure 1:
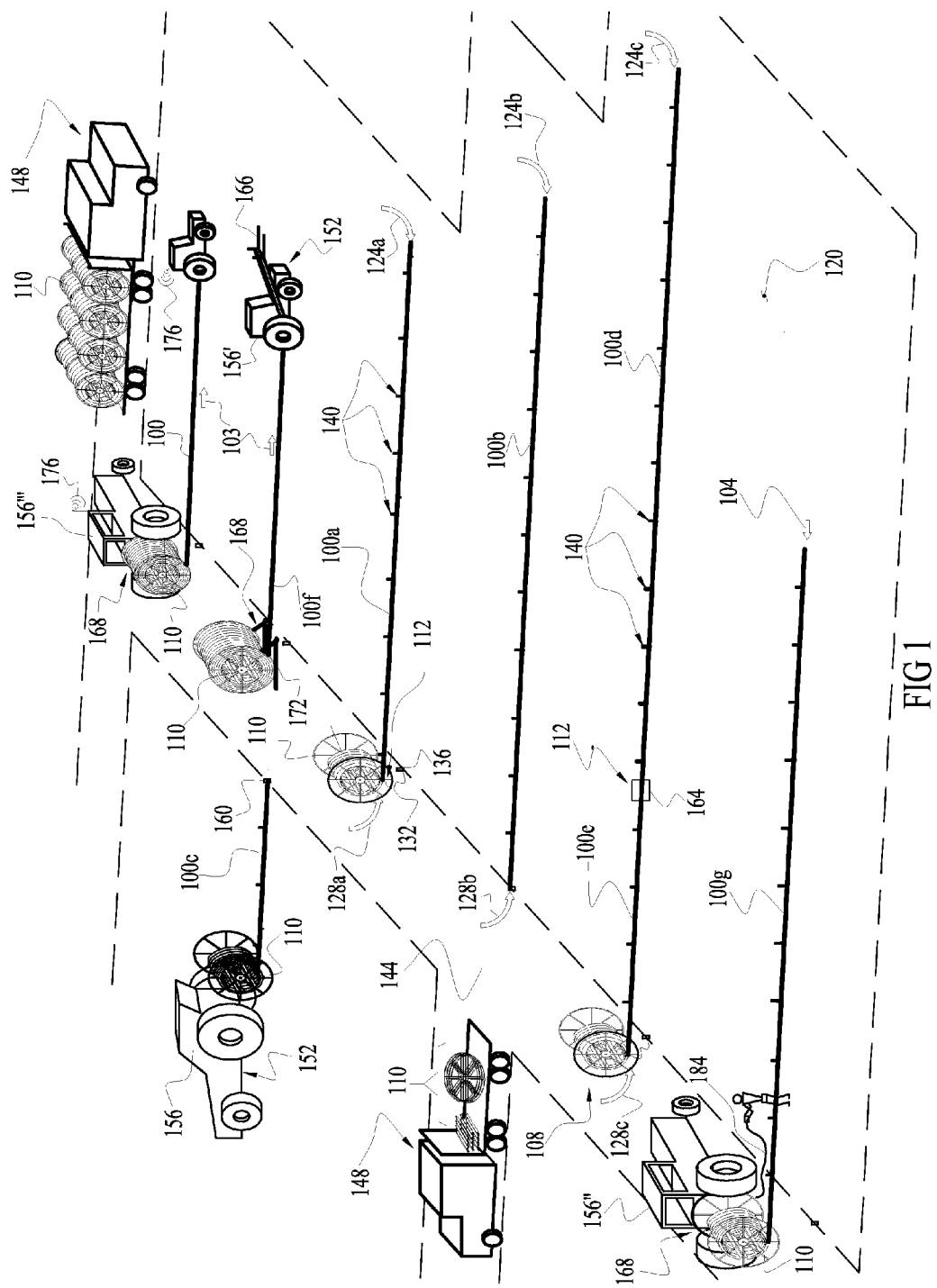
FIG. 1 is a view in perspective of certain structures, and their use, according to certain principles of the invention.

For simplicity, the invention will now be described with primary reference to a crop farm application, although no limitations are to be implied from the specific described examples. As illustrated in FIG. 1 (but not to scale), an embodiment according to certain principles of the invention improves deployment and/or retrieval of a conduit used in irrigation, such as conduit 100a. Deployment is indicated by arrows 103, and retrieval is indicated by arrow 104. An irrigation system according to principles of the invention reduces the amount of labor required to deploy and/or retrieve a length of conduit compared to conventional use of a plurality of lengths of rigid conduit segments that are coupled end-to-end during their deployment.

A conduit, such as lateral conduit 100a illustrated in FIG. 1, may have a cross-section of any desired configuration. Currently, a substantially round cross-section is prevalent and commercially available. However, in certain cases, it may be preferred for an exemplary conduit 100a to have a cross-section that inherently places the conduit in a desired orientation during the deployment process. For example, the conduit can be used to at least help orient the discharge direction of fluid emitters that are attached to that conduit. A tremendous savings in labor may then be realized over the case where each fluid emitter associated with a conduit must be manually oriented and secured in place. One operable orientation-urging cross-section is rectangular, including square. If present, the longer side of a rectangular cross-section is typically oriented parallel to the ground surface. It is further desirable for the cross-section of a conduit to resist displacement of the conduit from its deployed orientation during the irrigation process.

For purpose of this disclosure, a fluid emitter is intended to be broadly construed according to its dictionary meaning. An exemplary fluid emitter encompasses a sprinkler, such as conventional spinner, rotator, wobble, spray, impact, and other known types. Connection structure for a "sprinkler", or other fluid emitter, may also encompass a portion of an intervening riser element.

Conduit 100a may conveniently be delivered to (or removed from) the irrigation site with the conduit being coiled onto a storage device, generally indicated at 108. A workable conduit storage device includes spool 110. Details of a preferred embodiment of a spool 110 are set forth below, with reference to FIGS. 2A-2H. Desirably, one terminal end of the conduit 100a is affixed to the spool 110 by way of a coupling device, generally indicated at 112. A currently preferred coupling device 112 for this application includes the removable pull hook elbow, generally 116, illustrated in FIG. 3A. In this application, a preferred coupling device 112 holds the terminal end of conduit 100a in a workable association with the spool 110 (e.g. to facilitate spooling conduit onto the spool 110). Details of a preferred pull hook elbow 116 are set forth below, with reference to FIGS. 3A-I.

Desirably, a coupling device 112, such as indicated in FIG. 1 and disposed on the spooled-up terminal end of conduit 100a, also permits optional connection of a fluid source to that conduit. For example, a coupling device 112, such as currently preferred pull hook elbow 116, may be structured to permit connection of a fluid source to a conduit, regardless of if part of that conduit is spooled-up, or if that conduit is fully unspooled. Sometimes, the terminal end of the spooled-up portion of a conduit is simply capped, to permit application of a fluid source to the other terminal end of that conduit. In the latter case, it is desirable for provisions to be made so that the spooled-up length of conduit does not leak.

As illustrated in FIG. 1, the major portion of conduit 100a is stretched out in a line across the area 120 to be irrigated. A portion of conduit 100a was never deployed on the ground, and remained spooled-up on spool 110. In a preferred arrangement, the spooled-up terminal end of conduit 100a is simply capped with conventional structure, and a fluid source 124a is applied to the conduit's opposite terminal end. In that arrangement, hydraulic loss is minimized by reducing the length of conduit through which fluid must pass before being discharged from a sprinkler orifice.

In an alternative, and perhaps less-desirable arrangement, a fluid source 128a can be applied to the spooled-up end of conduit 100a. Conventional connection structure, such as a lay-flat hose 132 of the appropriate size and with commercially available end fittings, can communicate fluid from a fluid source, such as permanent fluid source connection fixture 136, to a coupling device 112 associated with the spooled-up end of conduit 100a, as is well known. The opposite and unspooled end of conduit 100a would then be capped with conventional plumbing structure. In either case, fluid is discharged over a portion of area 120 by way of a plurality of sprinkler ports, generally indicated at 140. Sprinkler ports 140 are typically spaced apart, as desired for any particular application, along the length axis of a lateral conduit, such as conduit 100a.

As used herein, a permanent fluid source may include a fluid delivery conduit that is buried in the ground, or otherwise disposed for a relatively permanent deployment in association with a field 120. Lateral conduits are typically connected to a fluid source associated with a permanent, or semi-permanent fluid delivery conduit. Sometimes, irrigations systems include portable manifolds and main lines, and embodiments of the invention are operable in that case also. A lateral conduit is typically temporary, and is generally deployed and retrieved on an annual, or shorter, basis. However, certain embodiments according to principles of the invention may be deployed as permanent (i.e. solid set), or relatively permanent, conduit installations.

With continued reference to FIG. 1, and in contrast to conduit 100a, conduit 100b is fully unspooled and stretched out in a line across the area 120. A conduit 100b may be cut-to-length, or special-ordered, to agree with the distance between a fluid source and an edge of a particular section of a field or area 120. When a conduit, such as conduit 100b, is fully unspooled, its transport/storage spool may be stored locally (e.g. at the side of an access road or section line 144), or placed on a transport, generally indicated at 148, and removed to a remote location for storage. Desirably, a spool 110 is structured for easy dis-assembly, to facilitate transport and storage.

It should be noted that a "line" defined by a conduit need not be absolutely straight, but can accommodate, for example, variations in the shape and elevation contour of surface 120. Also, the "line" may change its shape due to thermal expansion/contraction of the conduit, which may cause transverse conduit deflection. In any case, it is desirable for the deployed conduit to inherently urge an alignment of fluid emitting devices in a workable direction. That being said, an embodiment according to certain principles of the invention may still require manual alignment of portions of conduit or selected risers (even for each sprinkler riser), in a deployed configuration.

With further reference to FIG. 1, lateral conduits may be deployed in a variety of ways. As one example, conduit 100c is being deployed across the field area 120 by a deployment entity, generally indicated at 152. The illustrated deployment entity 152 for conduit 100c is a tractor 156, which includes structure adapted to carry and permit rotation of spool 110. The free end of conduit 100c can be restrained by an anchor 160, to facilitate the unspooling process. An operable anchor 160 may include structure associated with a fluid supply conduit, to which lateral conduit 100c is placed in fluid communication. A fluid source may be applied to either end, or both ends, of a deployed conduit such as conduit 100c. Either end of conduit 100c may alternatively be capped, to permit application of a fluid source to a single one of its ends.

With continued reference to FIG. 1, lateral conduit 100d is illustrated as fully deployed, and shorter than the width of area 120. Therefore, a second length of conduit 100e is coupled to one end of conduit 100d by way of a coupling device, generally 112. In this case, coupling device 112 includes a coupling adapter 164. Preferably, a coupling adapter 164 is structured also to cooperate with a pull hook elbow 116. Additional details of a currently preferred coupling adapter 164 are detailed below, in connection with FIGS. 4A-C. The spooled-up end of conduit 100e may be connected to a fluid source 128c, and the free end of conduit 100d may be capped. Alternatively, fluid source 124c may be applied to feed the combined conduits 100d and 100e. It is within contemplation that both fluid sources 124c and 128c may be simultaneously applied.

Conduit 100f is illustrated being deployed by a deployment entity 152. Optional and workable conduit deployment entities 152 non-exclusively include draft animals, one or more ATV, automobile, truck, and the like. In this case, deployment entity 152 is a tractor 156' that carries a forklift 166. Forklift 166 can be coupled to a spool 110 to move coils of conduit and other deployment/retrieval structures as desired. For example, forklift 166 can extract spools 110 from a transport 148 and distribute them along an edge of field area 120. As illustrated, the spool 110 for conduit 100f is coupled to support structure, generally indicated at 168, to permit unspooling from near the shoulder of road 144. A currently preferred spool support 168 includes the roller stop channel 172, which is detailed below with reference to FIGS. 5A and 5B. The roller stop channel 172 is typically employed to deploy a first conduit from a spool, and then can be moved to another location to deploy a different conduit. Sometimes deployment of a conduit, such as conduit 100f, is facilitated by wireless communication 176 between two or more parties.

The spool support structure 168 (illustrated by inference in FIG. 1) that is holding the spool 110 associated with conduit 100g is a motor/winch apparatus 180. A preferred motor/winch apparatus 180 is detailed below with reference to FIGS. 6A-G. The preferred motor/winch apparatus 180 can be employed both to unspool, and to spool-up conduit. As illustrated in FIG. 1, the motor/winch apparatus is being used in conjunction with spool 110 and tractor 156" to retrieve conduit 100g. The motor/winch apparatus is coupled to tractor 156" and is supporting spool 110 for winding-up conduit 100g. As illustrated in FIG. 1, control of the motor/winch apparatus 180 can be by way of a tethered remote 184. It is within contemplation to alternatively use a remote wireless communication device to control the motor/winch apparatus, and/or for controls to be local.

Still with reference to FIG. 1, sprinkler ports 140 are structured to removably connect, removably quick-connect, or quick-deploy a riser. In any case, a portion of the connection structure for a riser is disposed inside the hydraulic cross-section of the conduit. By "hydraulic cross-section", it is meant that the conventional inner bore of an unmodified section of conduit defines the hydraulic cross-section. For example, the hydraulic cross-section of a round conduit is (pi) times (the inner diameter of the conduit squared) divided by (4), or $\pi D_i^2/4$. It is contrary to conventional principles of sprinkler design to locate structure inside the hydraulic cross-section, because there is an attendant and unavoidable increased loss in pressure, or head loss, along a given length of conduit (due to interrupting the fluid flow inside the conduit), compared to unmodified conduit. However, the inventor has discovered that the labor-saving benefit of certain embodiments of the invention outweighs the increase in head loss.

With reference to FIG. 1, embodiments of the invention generally provide one of three types of connections between a lateral conduit and a riser. A first type of connection that can be included in individual sprinkler ports 140 includes a conventional screw-together structure, with a threaded socket affixed to the conduit, and a solid or pop-up riser being removably threaded into that socket. In this case, sprinkler ports 140 include a threaded socket disposed in penetration through the conduit wall, with a portion of the socket being disposed inside the hydraulic cross-section of the conduit. Risers are installed in desired sprinkler ports 140 as the spool is uncoiled for deployment in area 120, and are removed during spool coiling as the conduit is retrieved. Desirably, plugs are installed in sprinkler ports 140 of the coiled portion of conduit, and are selectively removed and replaced by risers as the spool is deployed. In that way, water can be applied to the coiled end of the spool and the spool will not leak. (e.g. in the case of a partially deployed spool of conduit). Plugs remaining in deployed lengths of conduit can increase axial spacing between risers, if desired. Preferred embodiments of a screw-together connection are detailed below, with reference to FIGS. 7A-F. Certain screw-together connection structure may include cross-channel stabilizer structure that can increase structural integrity of the conduit at the sprinkler port 140, and can facilitate automatic orientation of a deployed riser.

Still with reference to FIG. 1, a second type of connection that can be included in individual sprinkler ports 140 provides for a quick-connect coupling of a riser to the conduit. Quick-connect couplings may be characterized as reducing the time and effort required to connect a riser to a conduit (in the field) compared to a conventional threaded connection. Quick-connect couplings within the ambit of the invention include a portion of the coupling structure disposed inside the hydraulic cross-section of the conduit. Quick-connect couplings may be embodied as any of a variety of bayonet fittings, 2-stud quick connects, 1-stud quick connects, Cam-lock, Ring-lock, Lever-lock, Pneumatic type, Hydraulic type, push-on, claw-type, universal type, twisty quick, blanking clamp, split hose, threaded, and the like. For example, the ubiquitous spring-biased ball air hose coupling can make an operable quick-connect fitting. However, it is currently preferred to structure a quick-connect coupling similar to the socket that receives a cooperating keyed sprinkler riser in a conventional permanent sprinkler installation. Details of currently preferred quick-connect structures are detailed below with reference to FIGS. 8A-L. Desirably, quick-connect structure includes a normally-closed valve, so that coiled, or otherwise un-deployed portions of conduit do not leak. Certain quick-connect structure may include a cross-channel stabilizer that can increase structural integrity of the conduit at the sprinkler port 140, and can facilitate automatic orientation of a deployed riser.

Figure 9L:
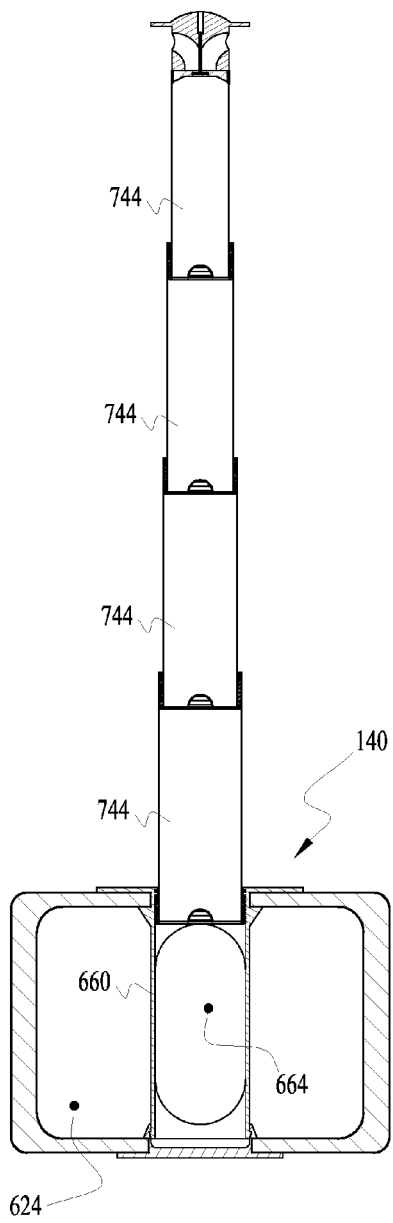
FIGS. 9A through 9Q illustrate details of a third preferred arrangement for coupling a riser to a fluid delivery conduit.
Figure 9K:
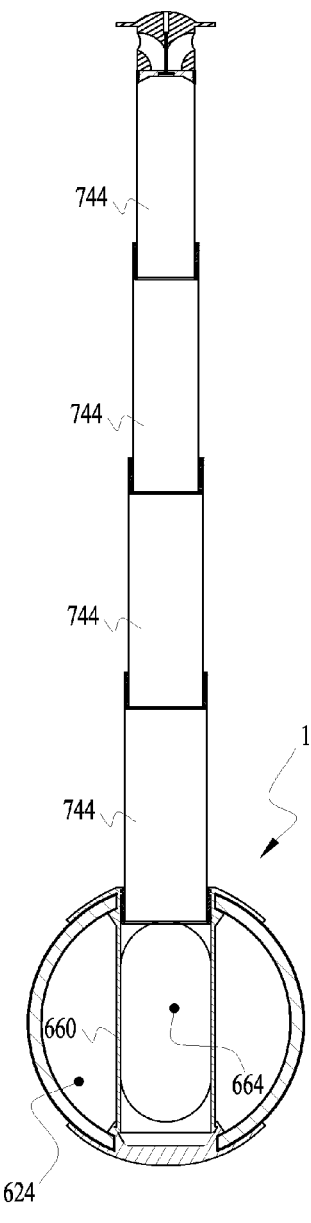
Figure 9J:
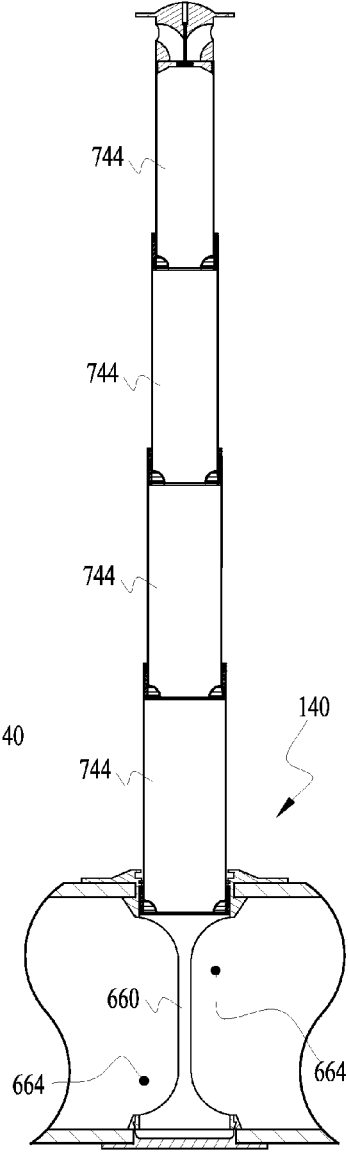

With continued reference to FIG. 1, a third type of connection that can be used with sprinkler ports 140 provides for quick-deploying a riser from the conduit. Quick-deployment connections typically reduce time and effort required to deploy a conduit in the field 120 compared to conduits having either conventional threaded connections, or quick-connect couplings at the sprinkler ports. A currently preferred quick-deploying riser is a pop-up riser with connection structure that is normally disposed inside the hydraulic cross-section of the conduit. Such pop-up risers may be structured in various ways, and may include a valve arrangement that resists discharge of fluid from the riser. For example, it is desirable that a valve may be closed at each sprinkler port that is coiled on a spool. An exemplary such valve includes a manually rotatable sprinkler emitter that can be placed into structural interference to hold it in a closed position with respect to the sprinkler port. Certain pop-up risers may be associated with cross-channel stabilizer structure that can increase structural integrity of the conduit at a sprinkler port 140, and can facilitate automatic orientation of a deployed pop-up riser. Details of currently preferred quick-deploying pop-up risers are set forth below, with reference to FIGS. 9A-Q.

Regardless of the type of connection to a riser provided by a sprinkler port 140 illustrated in FIG. 1, it is preferred that sprinkler ports 140 are structured to permit spooling-up of retrieved conduit onto a spool without having local protrusions from the conduit that cause damage to the coiled conduit by inter-coil contact. Therefore, it is desired that any exterior reinforcement structure disposed at a sprinkler port protrudes above the exterior surface of the conduit by less than about the wall thickness of the conduit. More preferred embodiments protrude by less than about ⅛ inches, or less. A method of using preferred embodiments includes removing rigid risers as the conduit is retrieved onto a spool. Desirably, at least certain sprinkler ports (e.g. on the inside, and more likely to be un-deployed, coils) are configured to resist discharge of fluid when in an un-deployed state. Preferred embodiments permit application of fluid to the coiled-up end of a partially deployed conduit, resist leaking of the coiled-up portion of conduit, and provide for controlled fluid discharge from deployed sprinkler ports.

Details of an exemplary conduit storage device, generally 108, will now be described with reference to the currently preferred spool 110 illustrated in FIGS. 2A through 2H. The spool 110 illustrated in FIG. 2A includes a pair of rims 200. Each rim 200 is attached (e.g. welded) to one end of a plurality of circumferentially spaced-apart, radially extending, spokes 204. The opposite end of each spoke 204 can be affixed (e.g. welded) to a hub 212, to form a wheel, generally 216. Each illustrated hub 212 provides a bearing port 220 arranged to support the wheels 216 for rotation about a common axis of rotation.

Wheels 216 are spaced apart by a core element, generally 224, onto which coils of stored conduit can be wound. A currently preferred core element 224 includes a plurality of circumferentially spaced-apart, axially extending supports, such as stringers 228. Collectively, stringers 228 form a substantially cylindrical surface 232, albeit interrupted. The core radius R1 (see FIG. 2E) defined by surface 232 is desirably at least as large as the minimum allowable bend radius for a particular conduit to be stored on the spool 110.

As illustrated in FIG. 2B, a conduit storage device 108 is desirably structured to permit assembly and dis-assembly of the device 108 in the field. It is more convenient to transport and store a plurality of dis-assembled spools, such as spool 110 or 110'. Note that in FIG. 2B, spool 110' includes an optional axle 236 structured to facilitate insertion of a bearing shaft on which to support the spool 110'. Axle 236 is structured for removable mounting to opposite hubs 212 (e.g. at flanges 240), to provide an internal guide surface (which can also sometimes be a bearing surface), that links opposite bearing ports 220.

With reference now to FIG. 2C, provision can be made to permit changing the core radius R1 to form a more versatile spool 110. For example, the core radius R1 (see FIG. 2E) can be increased if the total length of conduit to be stored requires fewer coils than would overflow the spool 110. That is, the radius R2 of a fully-coiled length of conduit is less than the wheel radius R3 (see FIG. 2D). On the other hand, the core radius R1 can be decreased (up to the minimum value for a particular conduit) to store an increased length of that conduit. Therefore, a single spool 110 can be structured to hold a maximum length of conduit for a first conduit having a first minimum bend radius. That spool can be modified to hold a longer length of a second conduit that has a smaller minimum bend radius, or to hold a shorter length of either first or second conduit, but at a larger minimum stored radius.

Still with reference to FIG. 2C, a stringer element, generally 228, may be adjustably and removably coupled to a spoke 204 by a clevis 244. One or more fastening element (e.g. a bolt, pin, peg, etc., not illustrated), can be used to affix the clevis end of a stringer 228 at a desired radial position on the spoke 204, as is well known. Alternative ways to manufacture workable adjustment mechanisms will occur to those of skill in the art.

As shown in FIG. 2C, a stringer 228 may include a spar 248 extending between opposite clevis elements 244. A spar 248 may support a fairing 252, which can partially define the interrupted core surface 232. Alternatively, each spar 248 may partially define the core surface 232. It is currently preferred that a space 256 be provided at one or more end of at least one stringer 228 to facilitate connection of an initial spooled-up and inside stored end of conduit to a storage device 108, such as spool 110, or 110'. For example, a space 256 may be structured to permit a pull hook elbow 116 (FIG. 3A) to engage with, and anchor on, a spar 248.

A spool 110 that is sized to store conduit of the type conventionally employed to irrigate as much as a quarter-, or half-mile of crop land can be a fairly large piece of equipment. It is preferred for a spool 110 to be sized in width W, and diameter D, such that a plurality of spools may be transported using conventional highway transport vehicles, such as flatbed transport vehicle 258. Therefore, a typical upper size for spool width W is equal to about the width of the bed of a transport vehicle. It is currently preferred for a maximum width W to be about 52 inches, to permit transport of paired spools 110 in a plurality of rows as illustrated in FIG. 2F. Spool wheels having a diameter D of less than about 104 inches can simply be stacked horizontally on a transport bed of conventional size. Wheels having larger diameters may require a transport rack to enforce a wheel vertical orientation, or a shipping size waiver. Table 1 presents workable sizes of steel stock for spool component members (e.g. spar, spoke, rim, etc.) for a variety of conduits. A workable hub can be fashioned from a ¼ inch, or ½ inch thick steel plate, or the like.

Preferably, a spool 110 is structured to permit use of conventional lifting equipment to move a loaded spool and its conduit cargo. As illustrated in FIGS. 2A and 2G, a space 260 between adjacent spokes 204 makes room for tines 264 of a forklift 268 to engage with, and lift, horizontal spokes 204. A plurality of loaded or empty spools 110 may even be stored horizontally, as illustrated in FIG. 2H. In such case, spacers 272 (such as 4×4 inch×8 feet lumber) may be placed between adjacent spools or a first spool and the ground.

Figure 3A:
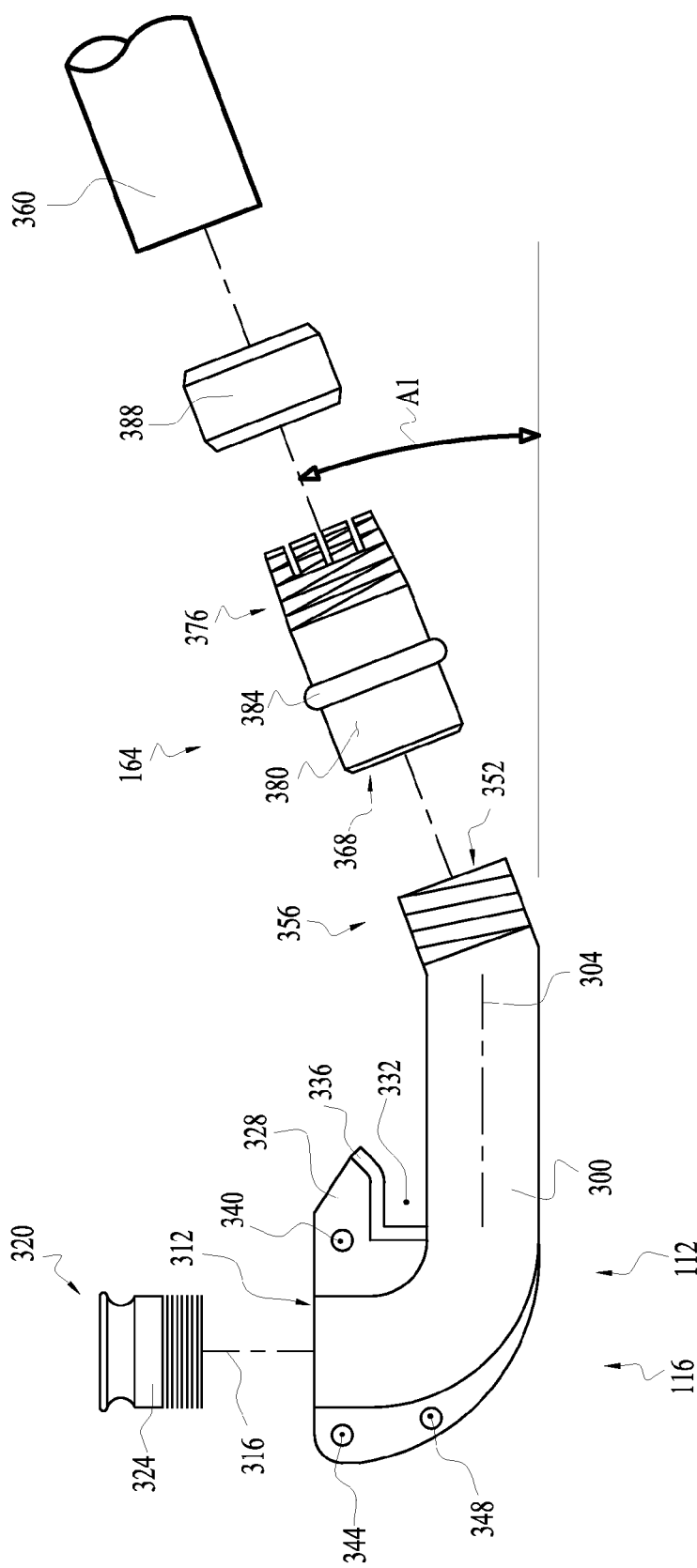

Details of a workable coupling device 112 for associating an end of conduit with a storage device will now be set forth with reference to FIGS. 3A through 3I. With particular reference to FIG. 3A, a currently preferred coupling device 112 for this application is the pull hook elbow generally indicated at 116. Pull hook elbow 116 includes a body 300 with a length extending along a central axis 304. A first fluid port, generally 312, disposed at a distal end is desirably configured to permit fluid flow in a direction generally orthogonal to body axis 304, as indicated by axis 316. First fluid port 312 includes a coupling structure, generally indicated at 320, to permit connecting the first port 312 to a water source, sink, or cap. Coupling structure 320 may be removable, such as the illustrated component 324, or a permanent or constituent part of the adapter 116. Operable coupling structure for port 312 could consist of the internal threads that receive cooperating threads on coupling 324. Conventionally, pipe threads are used in this situation, but other threads and coupling structures are workable.

Illustrated wind anchor hook 328 is configured to couple with structure of a spool, such as a spar. In general, hook 328 is structured to anchor one end of conduit to initiate spooling the conduit onto a storage device 108. As illustrated, a spar 248 may be received in capture space 332. The wind anchor hook 328 may be reinforced by one or more flange element 336 to resist bending, and distribute load over captured anchoring structure.

A plurality of apertures may be disposed about the distal end of pull hook elbow 116 to provide convenient attach points for manipulation of a conduit end. Aperture 340 is disposed for securing the pull hook elbow 116 in an anchored position with respect to a storage device 108. For example, a pin 341 (or other interfering element) may be inserted in penetration through aperture 340 and one or more cooperating bracket 342 to resist displacement of hook 328 from an installed position (see FIGS. 3G-I). Aperture 344 is disposed to provide a convenient lift point, as indicated by arrow L in FIG. 3C. Aperture 348 provides an optimized attach point for pulling conduit along the conduit length direction, as indicated by arrow P in FIG. 3C.

A second fluid port, generally 352, disposed at a proximal end is desirably configured to permit fluid flow in a direction off-axis from body axis 304, as indicated by angle A1. Second fluid port 352 includes a coupling structure, generally indicated at 356, to permit connecting the second port 352 to a conduit end 360. Angle A1 is determined for a particular size conduit, and is a function of the body length and minimum bend radius R1 (see FIG. 3B). Desirably, the off-axis angle A1 orients end 360 of the first conduit coil disposed tangent to the core of a storage device 108.

The proximal end of a pull hook adapter 116 is configured to connect to an end 360 of a conduit. The embodiment 116 illustrated in FIG. 3A is structured to connect with a coupling adapter, generally 164. Connection structure, generally 368, carried at a distal end of coupling 164 is configured to cooperate with coupling structure 356. Structures 356 and 368 may be embodied as pipe threads, bayonet twist locks, or any other structures operable to form a connection that can resist the axial load required to pull a length of conduit from an installed position in a field for spooling that conduit onto a storage device 108.

Figure 4A:
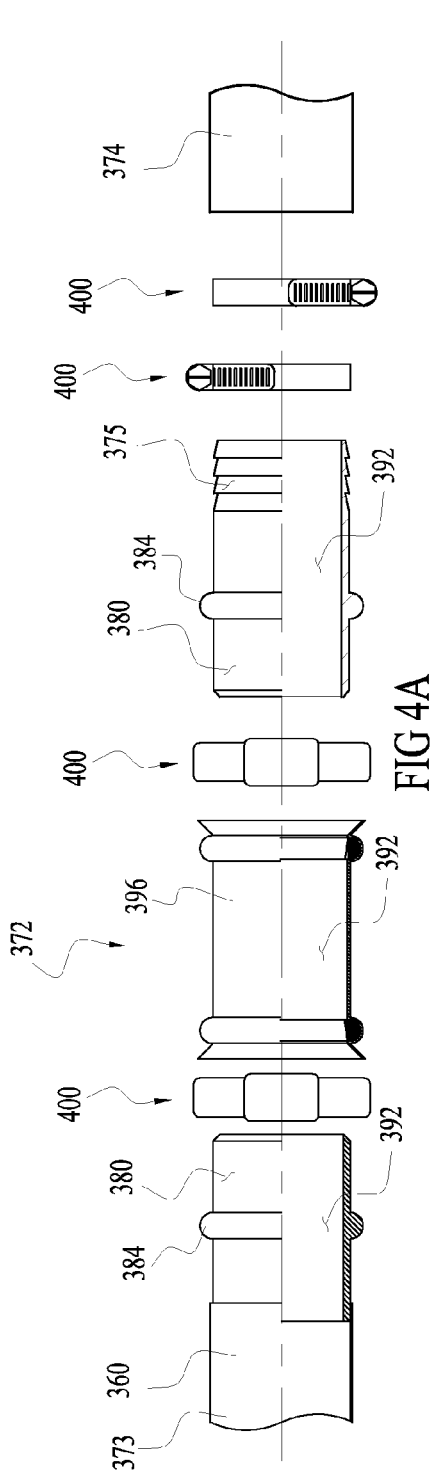
FIGS. 4A through 4C illustrate details of a preferred coupling adapter.
Figure 4B:
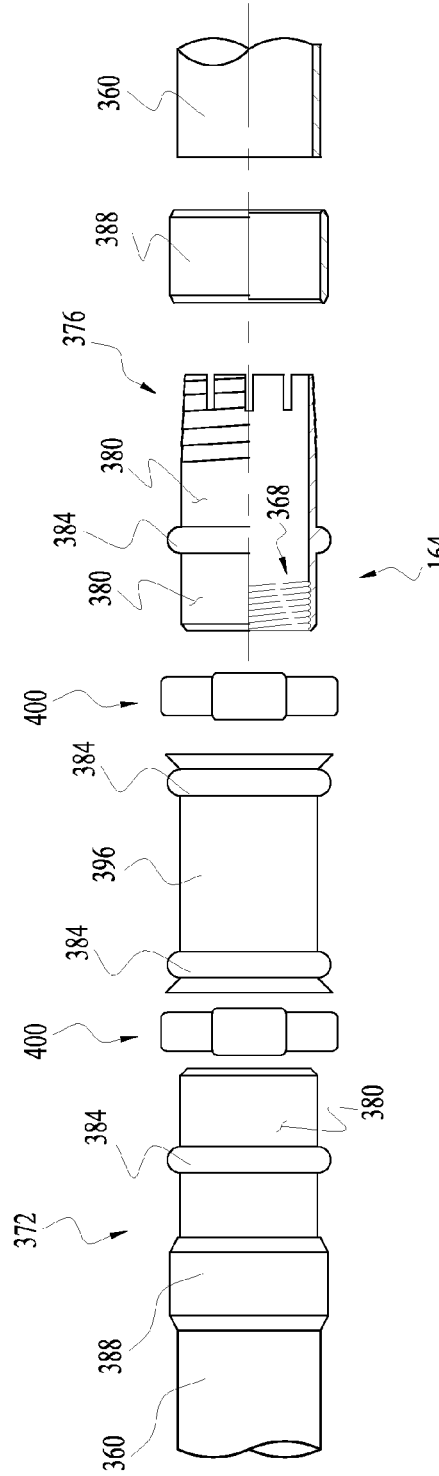
Figure 4C:
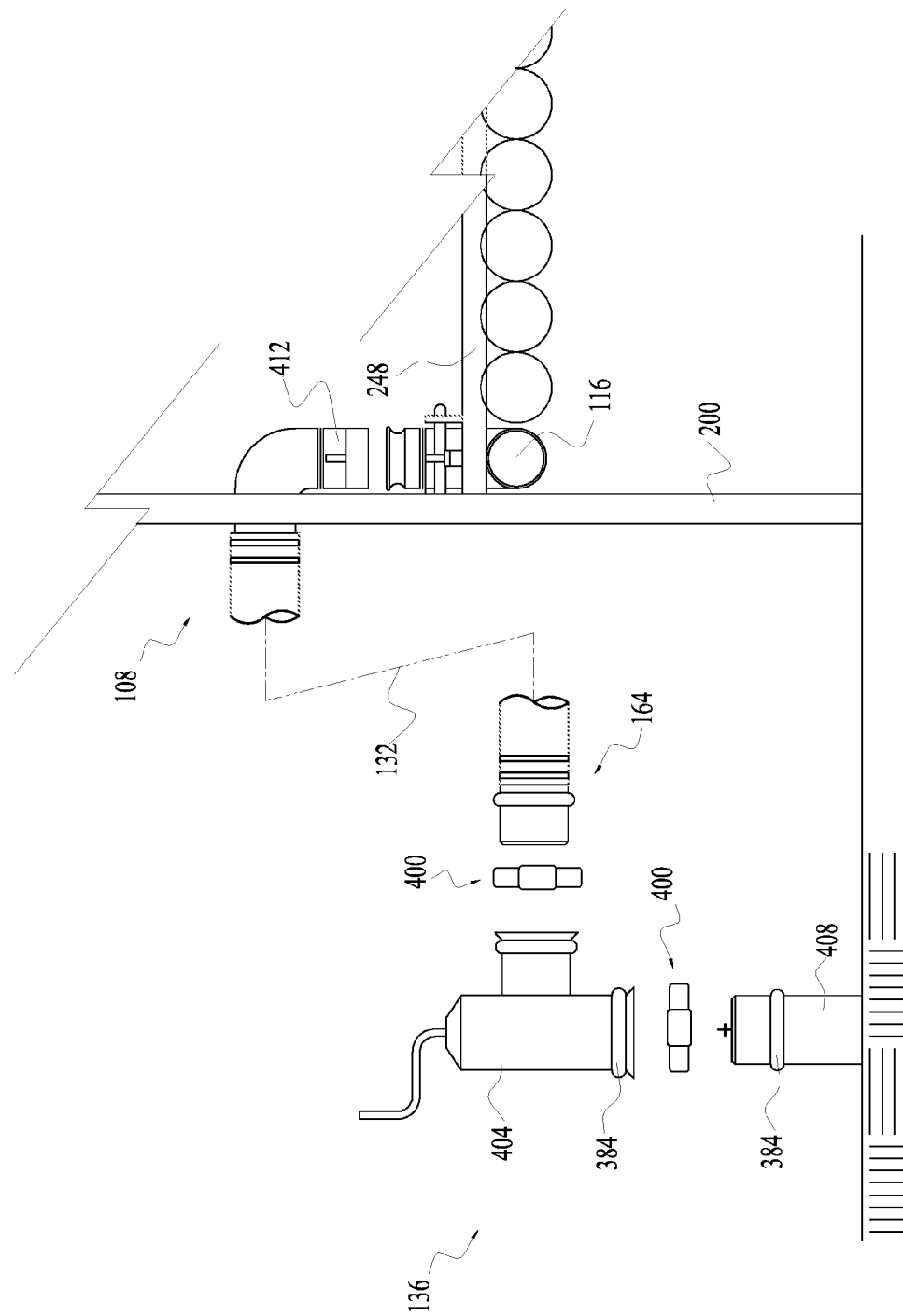

A currently preferred coupling adapter 164 is illustrated in FIGS. 4B and 4C. For convenient reference, a prior art coupling adapter is illustrated in FIG. 4A, and generally indicated at 372. The left side of coupling adapter 372 includes a male fitting of the type that may be affixed to an Aluminum pipe 373. The right side of coupling 372 includes a male fitting of the type that may be affixed to lay-flat hose 374 by way of nipple structure 375. The male fittings carry a smooth connection surface 380, and an anchor ring 384. Importantly, internal bore surface 392 is smooth. A prior art adapter 372 is conventionally inserted into female-female coupling sleeve 396, and cooperating anchor rings 384 are engaged by some sort of clamp device, generally 400, to form a fluid tight connection there-between. A clamp device 400 may be embodied as any one of a number of conventional clamping structures, such as ring-locks, lever-locks, cam locks, screw activated clamps, and the like.

With reference to FIG. 4B, a preferred coupling adapter 164 includes a male fitting having connection surface 380 and ring 384. Male self-tapping threads, generally 376, are carried at the opposite end for anchoring to a conduit 160. A compression ring 388 is installed on a conduit end 360, and threaded end 376 is twisted to install the adapter 372 into the conduit end 360. Coupling structure 368, such as the illustrated threads, is configured to cooperate with coupling structure 356 on a pull hook elbow 116 (see also FIG. 3A).

With reference to FIG. 4C, an embodiment according to certain principles of the invention may be coupled to a fluid source, such as to the fluid connection fixture generally indicated at 136, using conventional intermediary tubing, such as lay flat hose 132, or other convenient conduit section. An adapter coupling 164 structured according to certain principles of the invention may be interchanged for a conventional coupling 372 at one or both ends of the hose 132, or even for any other conduit end that has an end connector installed.

In FIG. 4C, fluid connection fixture includes a valve opening elbow 404 connected to a valve stub that extends from a buried fluid conduit source. Sometimes, a female cam-lock fixture 412 may be provided on one end of a hose 132, to facilitate connection within the space available inside the core of a conduit storage device 108.

Figure 5B:
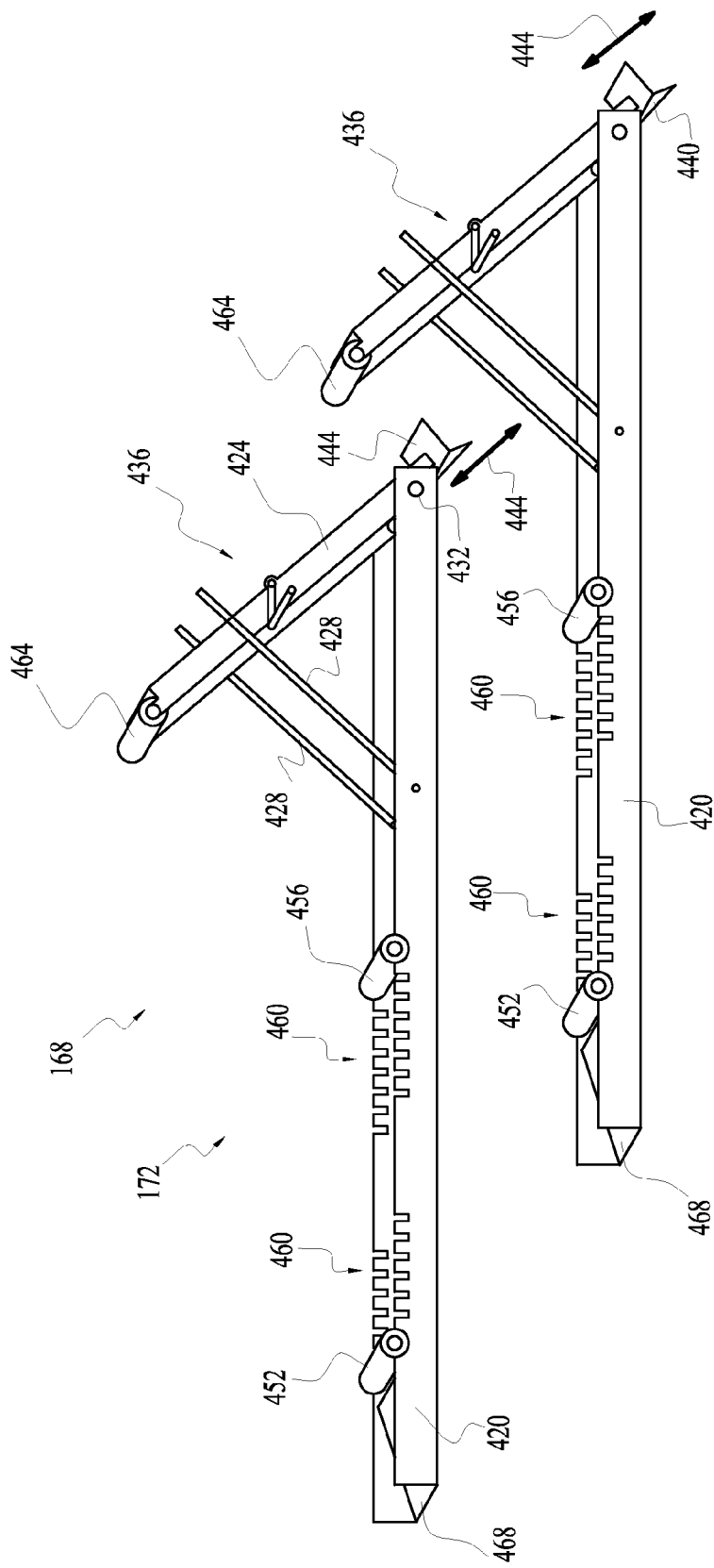
Figure 5C:
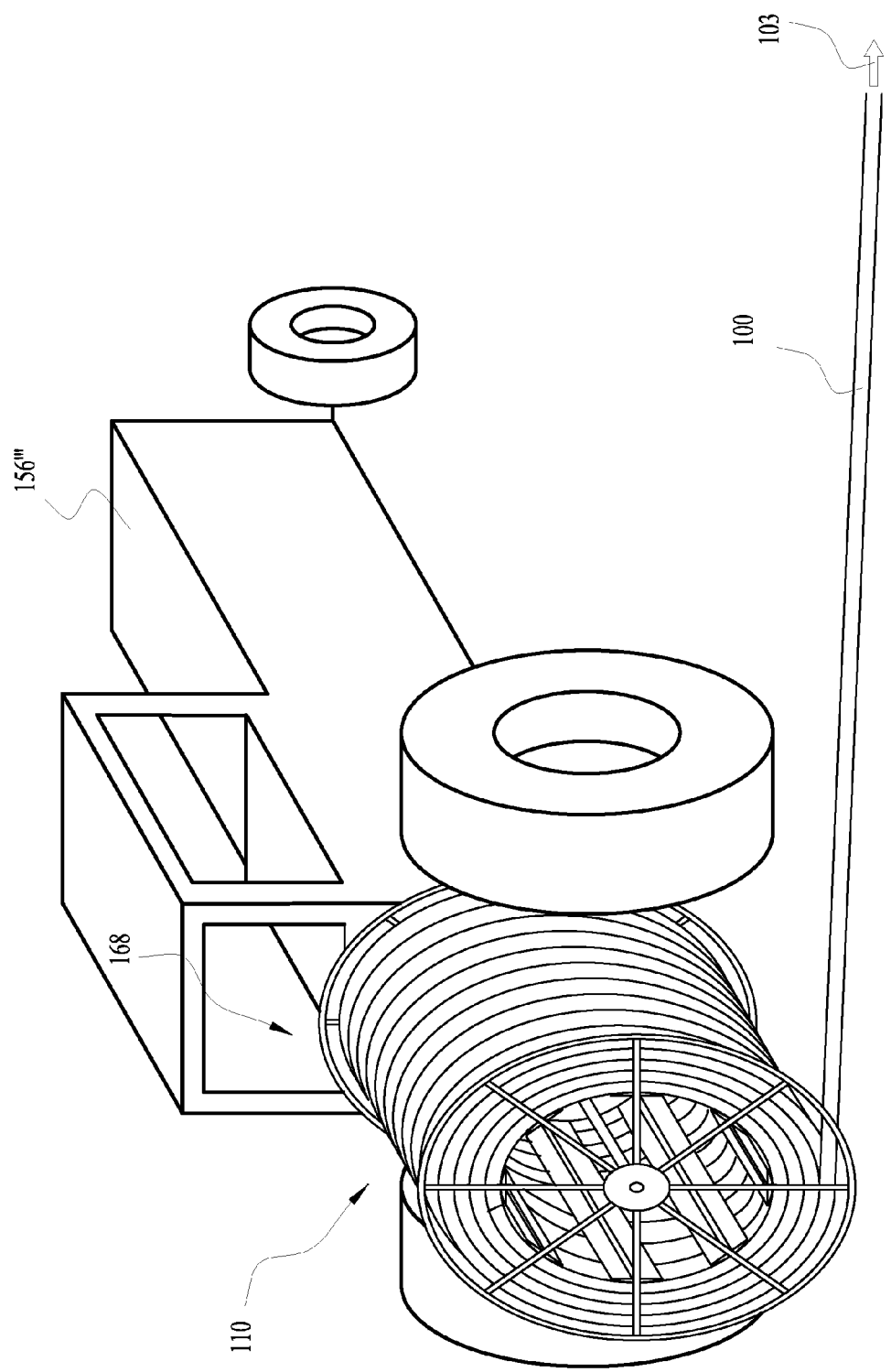

Certain spool support structures, generally 168, that are operable to support a conduit storage device 108 during deployment of a stored conduit for irrigation are illustrated in FIGS. 5A through 5C. In detail, FIGS. 5A and B illustrate operational details of a roller stop channel, generally 172. A roller stop channel 172 provides rolling support for the opposite rims 200 of a spool 110 to permit deployment of a conduit 100. Deployment of the stored conduit 100 is indicated by arrow 103.

The roller stop channel 172 illustrated in FIGS. 5A and B includes a body 420 that is coupled to a brace arm 424 by way of one or more adjustable linkage element 428. Brace arm 424 is pivotally coupled to body 420 at pivot axle 432. Consequently, a deployed angle A2 may be adjusted as desired to accommodate spools of different diameters, or changes in grade at different unspooling sites. An adjustment mechanism, generally 436, may be provided to extend or retract a foot 440, to accommodate uneven ground, or changes in grade. Extension or retraction of foot 440 is indicated by two-headed arrow 444.

The weight of a loaded spool 110 is carried by rear roller 452 and front roller 456. Provision is desirably made to permit adjusting relative positions of rollers 452 and 456 to accommodate between different spools 110 having different diameters. As illustrated, a plurality of slots, generally 460, individually receive an axle for a roller, and thereby provide an exemplary adjustment mechanism. Other operable adjustment mechanisms to provide support for spools having a range in different size diameters will occur to those of skill in the art. Stop roller 464 provides assurance that the spool 110 does not roll forward from a weight-supported position on a roller stop channel 172. Together, the three rollers 452, 456, and 464 carried on each of a pair of roller stop channels 172 are adjustable to provide sufficient constraint to permit unattended rotation of a spool 110 during deployment of a conduit, such as generic conduit 100.

In use of a pair of roller stop channels 172 to unspool conduit, opposite rims 200 of a spool 110 may be lowered, e.g. by a fork lift, onto respective rollers 452 and 456. It is within contemplation that a spool 110 may alternatively be rolled into a dispensing position. Therefore, sometimes a ramp element 468 may be included at the entrance, or approach area associated with a rear roller 452, to facilitate rolling the rim 200 of a spool 110 into a dispensing position on a roller stop channel 172.

FIG. 5C illustrates a closer view of a portion of the structure originally illustrated in FIG. 1. Tractor 156''' is supporting a spool 110 with a spool support structure, generally 168. Although a direct view of the support structure 168 is blocked by the perspective, support structure 168 encompasses a motor winch apparatus 180 carried by, or coupled to, tractor 156'''. Details of a preferred motor winch apparatus 180 are illustrated in FIGS. 6A through 6G.

With particular reference to FIGS. 6A-6C, the preferred motor winch apparatus 180 includes a lance 480 rotatably attached to a frame 484. Distal bearing 488 and proximal bearing 492 are structured to interface with cooperating openings, or bearing ports 220, in a spool hub. The lance 480 is structured to support the entire weight of a fully-loaded spool of conduit. Provision is made, such as coupling structure generally indicated at 496, to couple with, and apply rotation to, a spool, such as a spool 110 or 110' (FIG. 2B). Coupling structure 496 includes a pair of clevis legs 500 that are spaced apart to form a socket 504 in which is received a spoke 204 of a spool 110.

When a spool 110 or 110' is installed on the lance 480, some sort of provision is desirably provided to resist decoupling the spool and lance. An exemplary way to secure a spool in place includes a safety pin 508 and blocking washer (not illustrated). The pin 508 blocks distal motion of the washer, which in turn resists distal motion of the spool. Alternative retention measures are within contemplation, including application of one or more pin 108 through respective pairs of clevis legs 508 effective to couple one or more spoke 204 inside a respective socket 104.

A plurality of coupling structures 496 are individually carried on respective arms 516 for disposition at a radial distance from the lance 480, effective to apply torque onto a plurality of spokes of a spool. A driven gear, e.g. ring gear 520, is affixed to a plurality of arms 516 to carry the required torque. A pinion gear 524 meshes with the ring gear 520, and can be used to rotate the arms 516 and a spool 110 (if present). Sometimes, the pinion gear may be decoupled, or placed into free-spool, to permit rotation of a spool 110 (e.g. when unspooling a conduit). Pinion gear 524 may be turned by a hydraulic motor 528, power take-off, or any other convenient source of rotation.

Frame 484 may be essentially built-in to a device, such as a tractor. However, it is currently preferred to provide a removable mounting arrangement. An operable mounting arrangement includes a conventional 3-point mounting system, including pins 532 and 536 and clevis 540. A third pin (not illustrated) is received in through-hole 544. It is also operable to provide a conventional lifting hook arrangement, including one or more bracket 548 that defines a socket 552 in which to couple with a supporting and/or lifting element. Other operable arrangements include lifting elements for Fork lifts, Telehandlers, Loaders, tractors with bolt-on or weld-on mounts, and the like.

Figure 6E:
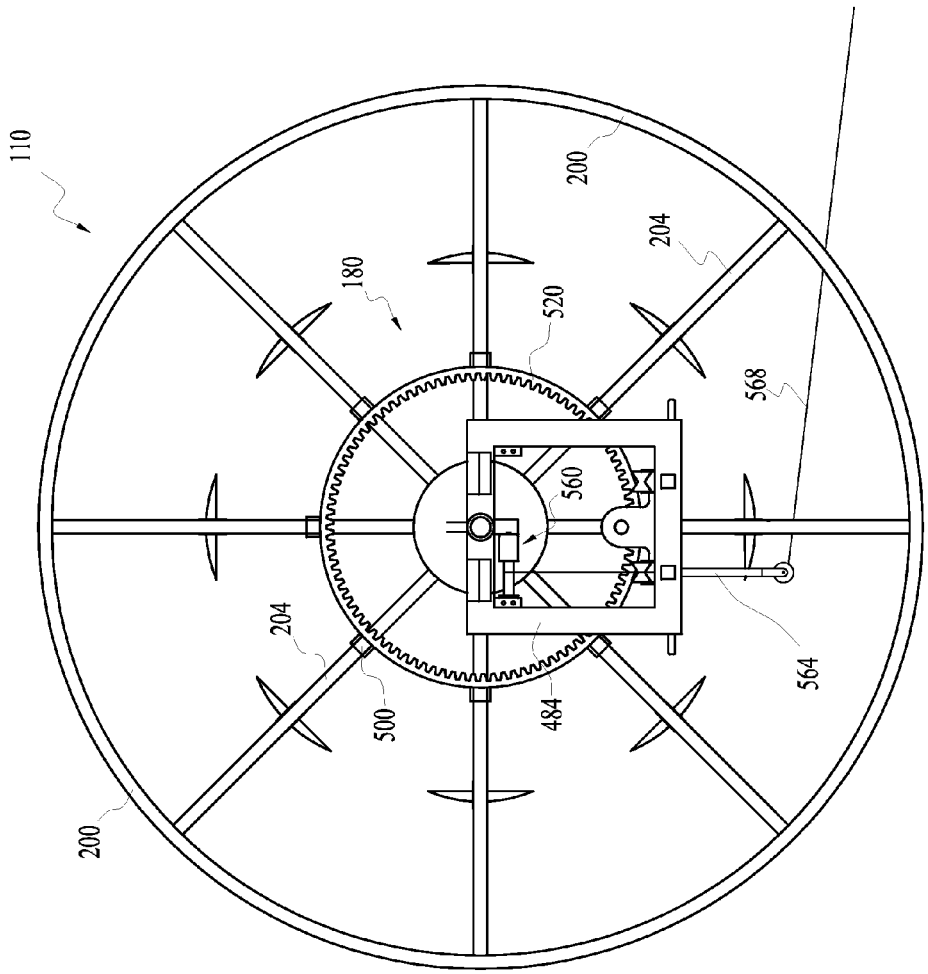
Figure 6D:
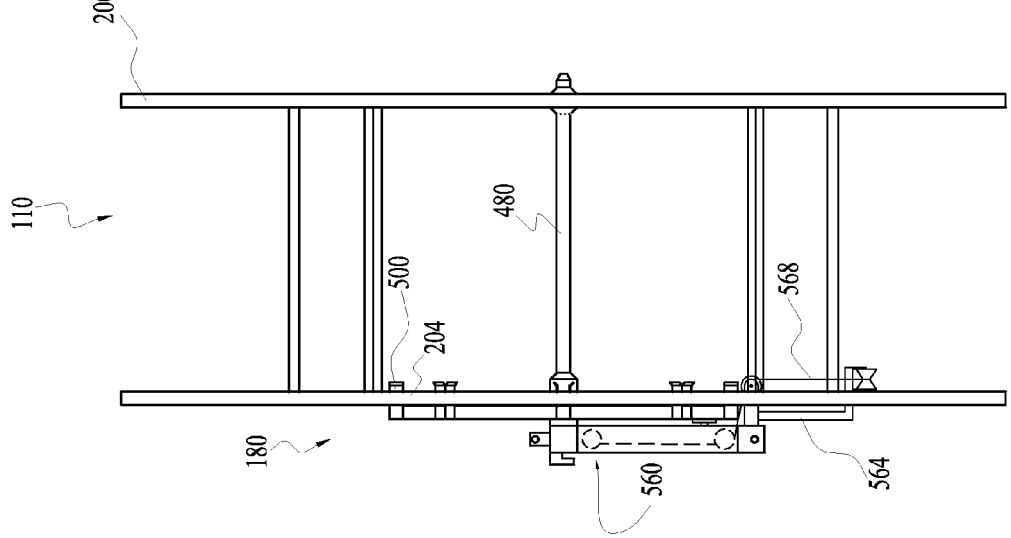
Figure 6G:
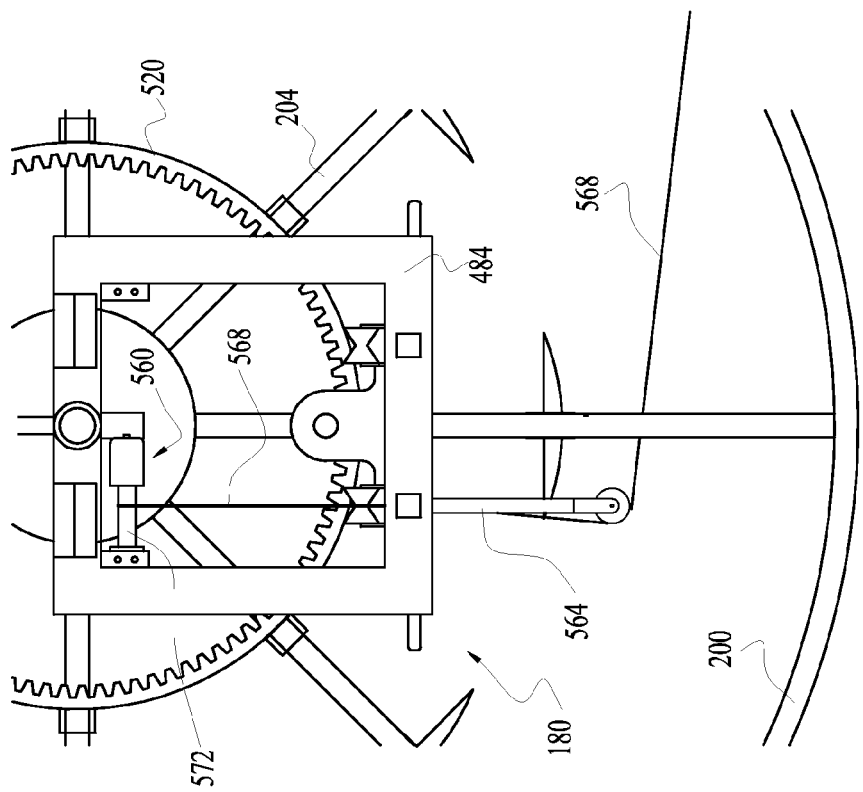
Figure 6F:
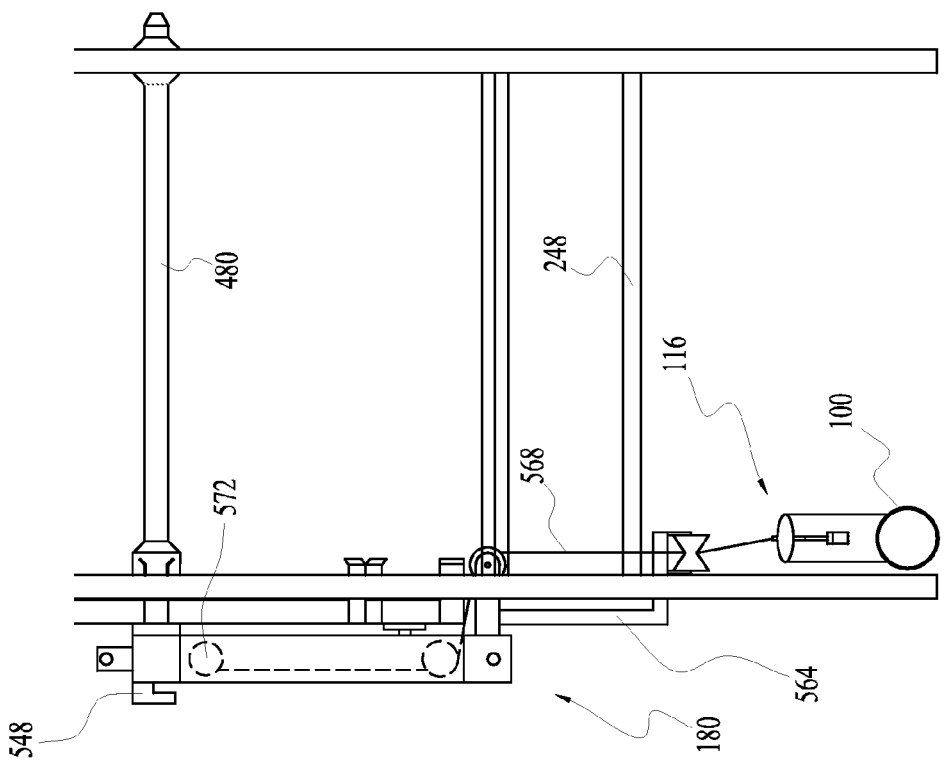

Conduit suitable for irrigation may be too heavy for a person to position for spooling-up without assistance. Therefore, it is desirable to incorporate a winch, generally 560, that is arranged to move a conduit into a desired position. A redirection roller assembly 564 advantageously is included to rout a distal end of cable 568 as desired and still provide an operable spool-up path for a proximal portion of cable 568 onto drum 572. A winch 560 may be mounted for either left-hand, or right-hand operation. Also a roller assembly 564 may be received in either socket 576, or 580, depending on if right-hand or left-hand operation is desired. As illustrated in FIG. 6F, a pull hook elbow 116 may be manipulated by cable 568 into position to engage central spool structure, such as to permit engaging coupling structure 320 onto a spar 248 (e.g. see spar 248 in FIG. 2C).

As mentioned above, irrigation conduit according to certain principles of the invention is sufficiently flexible as to permit coiling the conduit onto a storage spool, and to permit unspooling conduit for deployment in a location to be irrigated. The uncoiled conduit distributes a plurality of sprinkler ports 140 in a line across the area. For purpose of this disclosure, an as-manufactured conduit has a generally uniform cross-section that defines a hydraulic cross-section. A hydraulic cross-section perimeter is defined by the conduit wall's conventional inside surface. Although alternative arrangements are feasible, a typical hydraulic cross-section is approximately circular, or rectangular. (In practice, the actual conduit cross-section departs from a theoretical round or rectangular shape due to flexion, sag, and other factors.)

Desirably, the external surface of the conduit does not depart significantly from the as-manufactured profile in the area of a sprinkler port. Therefore, conduit can be spooled-up without significantly changing a basic lay-down pattern between sprinkler port areas and intervening stretches of conduit. That is, spooled-up sprinkler ports 140 are desirably structured to facilitate smooth conduit spooling to avoid imparting kinks, dents, and damage to adjacent conduit stretches.

A sprinkler port 140 according to the invention may be embodied in a plurality of different ways. One structural aspect held in common between all embodiments is that a portion of the connection structure for a fluid emitter at a sprinkler port 140 is carried inside the hydraulic cross-section. That is, each sprinkler port includes an affixed connection structure operable to removably connect, removably quick-connect, or quick-deploy a riser, and a portion of the affixed connection structure is disposed inside the hydraulic cross-section of the conduit.

A first exemplary type of sprinkler port 140 includes a threaded connector, generally 600. Connector 600 includes a threaded socket 604 and a flange 608A or 608B. Note that the flange shape may be adapted to cooperate with the surface of a particular conduit. For example, flange 608A is structured for attachment to the flat surface of a rectangular conduit 612. In contrast, flange 608B is structured for attachment to the cylindrical surface of a round conduit 616.

Socket 604 is received in a cooperating aperture 620 (or a through-hole in a conduit wall). Therefore, upon assembly, a portion of connector 600 (for receiving and/or holding structure associated with a fluid emitter in an operable relation with port 140) is disposed inside the hydraulic cross section 624 of the conduit. As illustrated in FIGS. 7A-C, exemplary threaded discharge aperture 628 is disposed inside the hydraulic cross-section 624 subsequent to assembly.

The embodiments of a threaded connector, generally 600, illustrated in FIGS. 7A-C are arranged for connection to a single wall of a conduit, e.g. by affixing the flange 608A or 608B to form a fluid-tight seal. It is further within contemplation to include an optional reinforcing cover 632. Flange and covers are structure that is operable to orient the centerline of the threaded aperture 628, and consequently, a riser connected there-to.

A flange and/or cover may be bonded adhesively to the conduit. The flange and/or cover may be affixed by welding (including solvent, thermal or sonic), to the conduit. Sometimes, distributed apertures 636 are provided in a flange to facilitate distributed attachment of a cover 632 to the conduit wall. Alternative ways and structural changes operable to cause an operable fluid-tight connection between a threaded connector 600 and a fluid-carrying conduit will be apparent to one of ordinary skill. In any case, it is desirable for the connector 600 to be structurally coupled to a conduit in a way that assists a conduit to orient a length axis of a riser portion of a sprinkler that is coupled to a port 140, merely by unspooling, or otherwise deploying, the conduit.

Desirably, the thickness of a cover, such as cover 632, does not provide a significant departure from the conduit surface, and therefore, does not produce a bump that will damage conduit during a spooling operation. Desirably, the thickness of a cover is less than about the thickness of the conduit wall. In preferred embodiments, the cover thickness is less than about ¼ inches. In some embodiments, the cover thickness may be less than about ⅛ inches.

In certain cases, it is desirable to introduce fluid to the partially spooled-up end of a conduit for irrigation from un-spooled sprinkler ports 140. In that case, it is desirable for sprinkler ports that are spooled-up, or otherwise not deployed, to include valve structure to resist undesired fluid leaking from sprinkler ports 140 that are not being used for irrigation. A simple version of such valve structure includes plug 640, which may be removably installed in threaded discharge aperture 628 to resist fluid flow from a particular sprinkler port 140, as desired. In use, at least the inner ports 140 of a coil of conduit may be fitted with plugs 640 when coiling onto a spool 110. Any exposed plug(s) 640 may then be removed prior to installing a riser during uncoiling and deployment in a field.

Figure 7F:
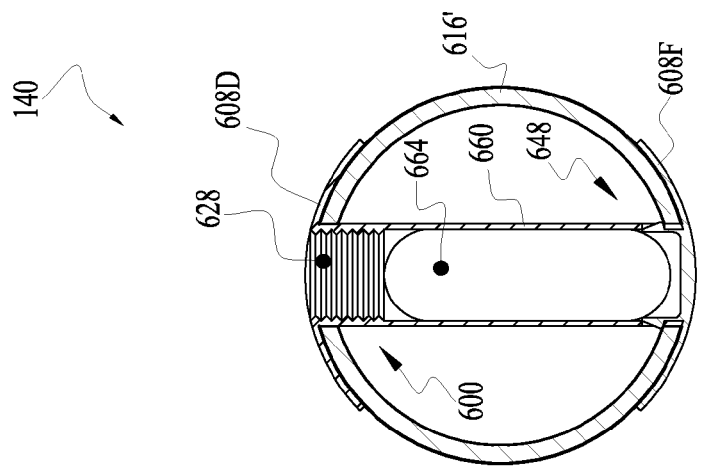
Figure 7E:
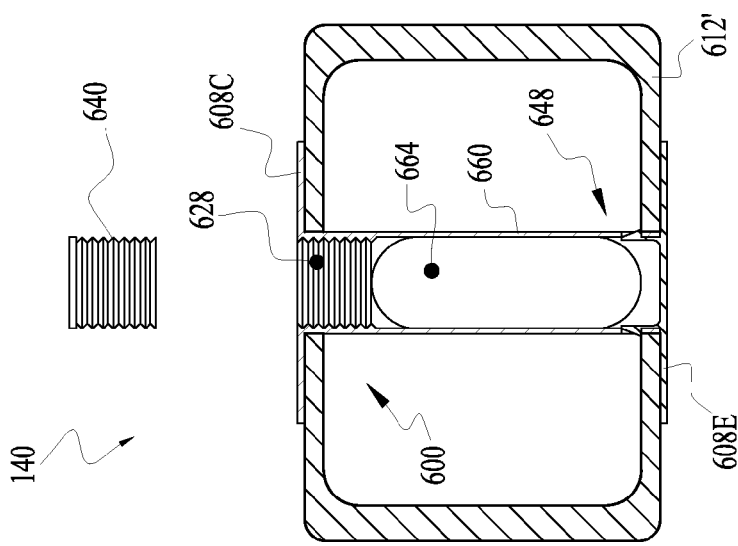
Figure 7D:
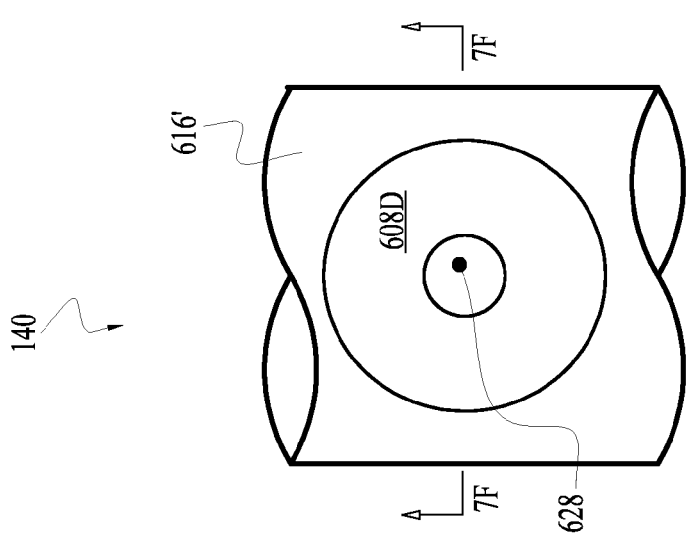

The embodiments of a threaded connector, generally 600, illustrated in FIGS. 7D-F are arranged for connection to opposite walls of a conduit. When anchor structure at an opposite side of a conduit is present, the embodiment is typically characterized as including a cross-channel stabilizer, generally 644. For example a flange 608C or 608D may be affixed to a conduit on one side to form a fluid-tight seal, and a flange 608E or 608F may be affixed to the opposite side to form a fluid-tight seal. As illustrated, opposite ends of the adapter are structured to form a snap-together assembly, including fingers received in sockets at junction 648. Alternatively, cross-channel stabilizing structure may not penetrate both sides of a conduit. For example, a "foot" may simply be engaged by interfering structure of the conduit wall opposite a discharge aperture, such as discharge aperture 628.

It is within contemplation that a connection between a component, such as a connector 600, and a conduit wall may be effected in too many ways for a reasonable listing in this document. For example, it is within contemplation that a barb fitting 602 (e.g. see FIG. 8E) may be placed through a conduit wall. The barb fitting may be sufficient on its own, to form a fluid-tight connection. One or more other element, such as an O-ring, adhesive, sealant, and the like, may also be included in a joint. Various other structures and elements are readily understood by one of ordinary skill in the art as operable to accomplish a workable fluid-resistant seal at one or both sides of a conduit to form a workable sprinkler port 140. A simple threaded connection between internally disposed anchor structure (for a riser) and a conduit wall is one exemplary such arrangement.

The threaded aperture 628 of the embodiments illustrated in FIGS. 7D-F includes, or is otherwise coupled to, one or more connecting leg 660 extending toward an anchor located on the opposite side of a conduit. Leg 660 forms an extension anchored on the opposite side of the conduit by cooperating structure. Consequently, leg 660 further structurally couples aperture 628 to a conduit on which the sprinkler port is installed, compared to only a local arrangement such as illustrated in FIGS. 7A-C. Therefore, the orientation of a centerline of installed aperture 628 is further oriented under influence of the conduit, itself, by simply deploying a conduit having a cross-channel stabilizer (e.g. conduit 612' or 616'), in an irrigation setting. When one or more stabilizing leg 660 is present, the embodiment is characterized as including a cross-channel stabilizer.

A side-wall opening 664 permits enhanced fluid egress through threaded aperture 628 for irrigation. Structure extending from one side to the opposite side of a conduit cross-section causes an increase in pressure drop in fluid flowing through the conduit, compared to the case of an unobstructed conduit. Therefore, it is desirable to include a flow-through side-wall opening 664 on both upstream and downstream sides of an installed cross-channel stabilizer. That arrangement also permits equivalent application of a fluid source to either end of a fluid delivery conduit. Desirably, fluid egress openings, such as side-wall openings 664 in a cross-channel stabilizer, are structured to minimize pressure drop along the length of a conduit due to presence of connection and/or stabilization structure disposed inside the conduit's hydraulic cross-section.

Figure 8E:
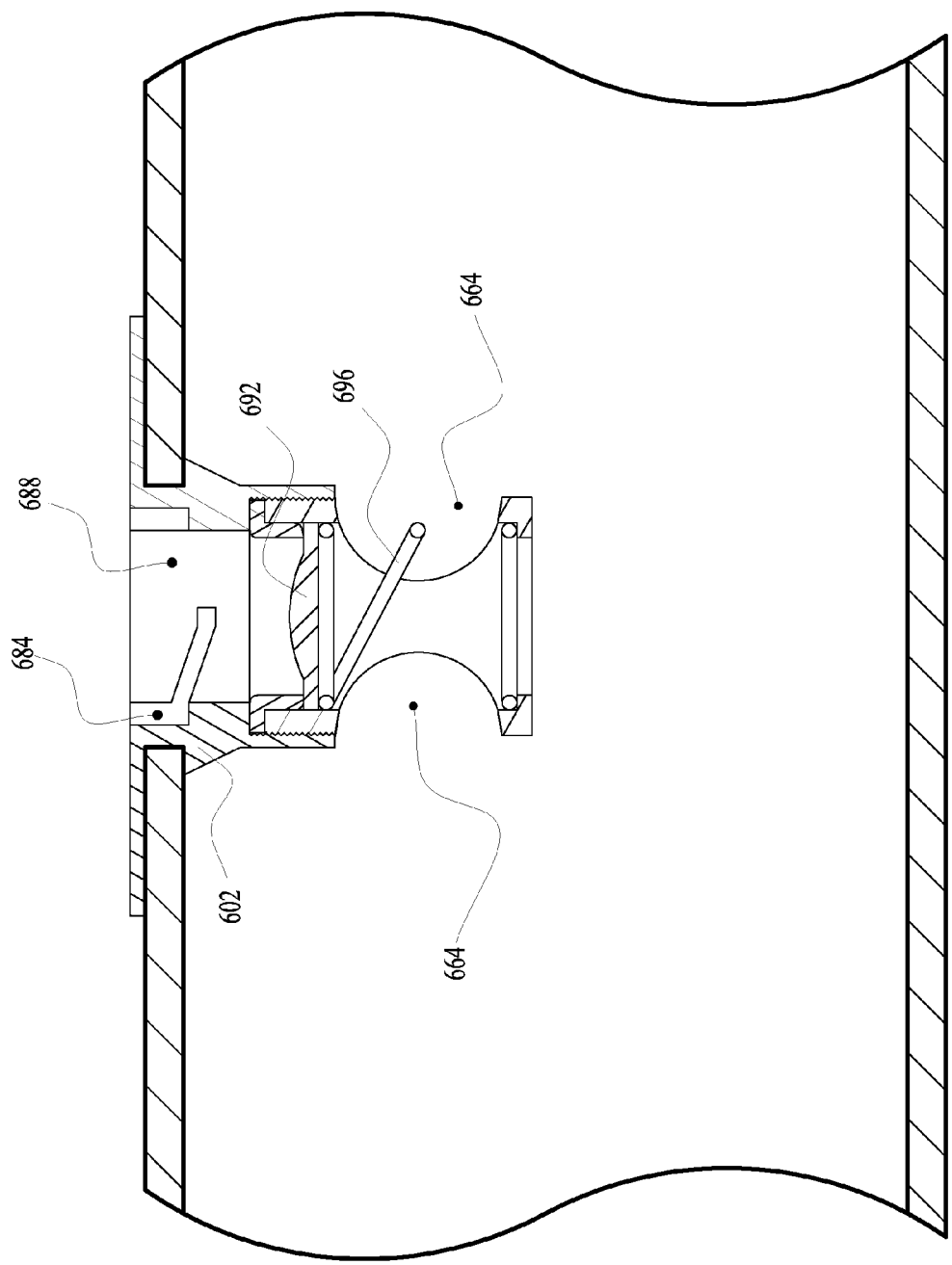

FIGS. 8A and 8C are top views of a second type of sprinkler port 140 disposed on a rectangular conduit 612 and round conduit 616, respectively. FIGS. 8B and 8D are cross-section views taken at sections 8B-8B and 8D-8D in FIGS. 8A and 8C, respectively. FIG. 8E is representative of a cross-section view taken along the central length axis of either the rectangular or round conduit in FIGS. 8A and 8C. The second exemplary type of sprinkler port 140 includes an internally-disposed quick-connect valve, exemplary embodiments of which are generally indicated at 680 in e.g. FIGS. 8B and 8D. Internally-disposed means that, as illustrated, the valve 680 is installed inside the hydraulic cross-section 624.

Figure 8G:
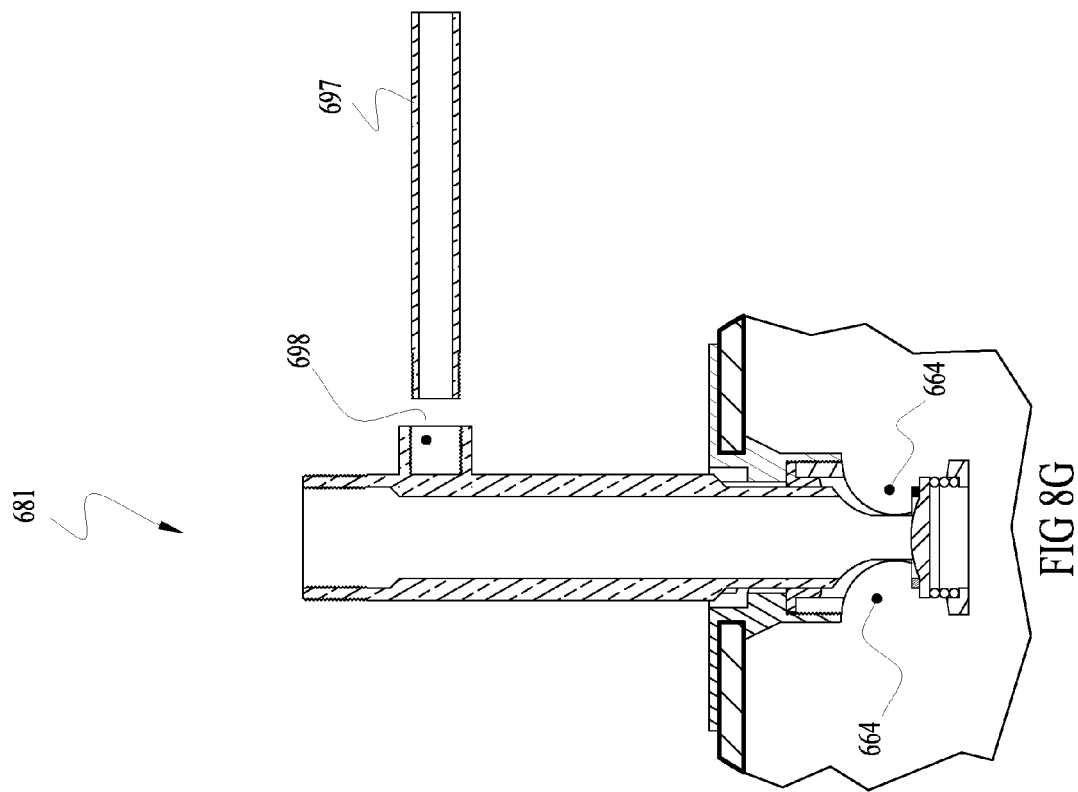
Figure 8F:
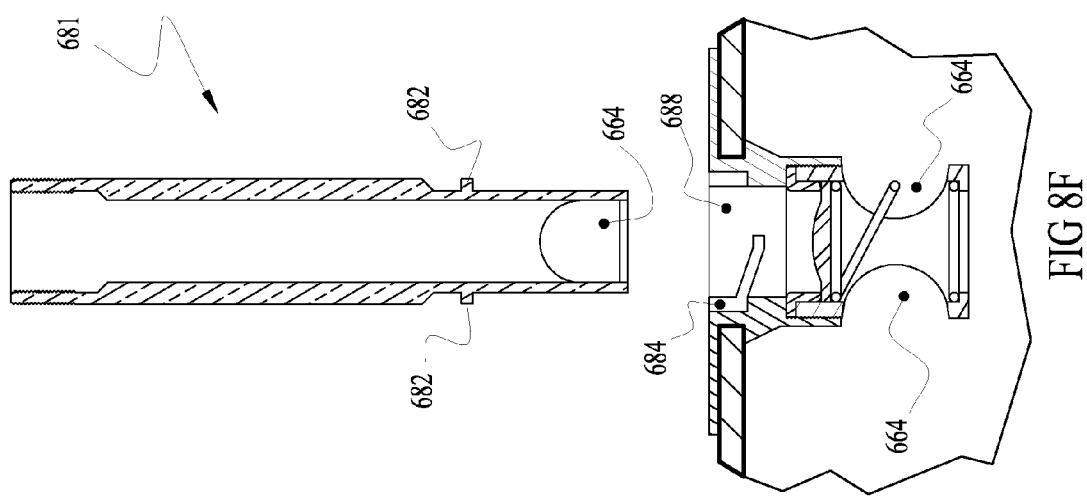
Figure 8J:
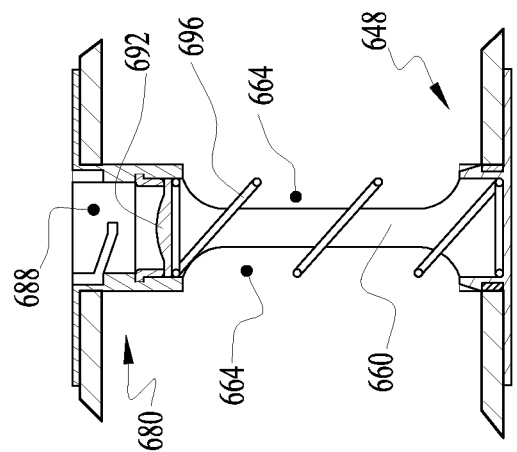
Figure 8I:
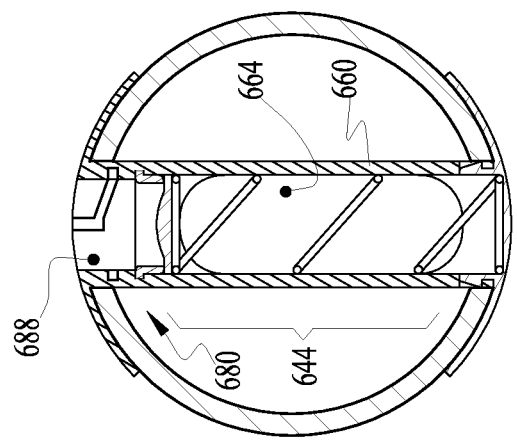
Figure 8H:
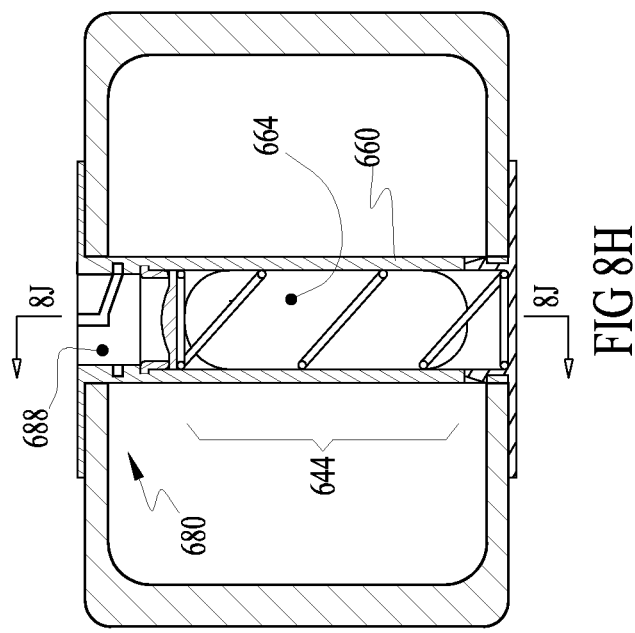
Figures 8K, 8L:
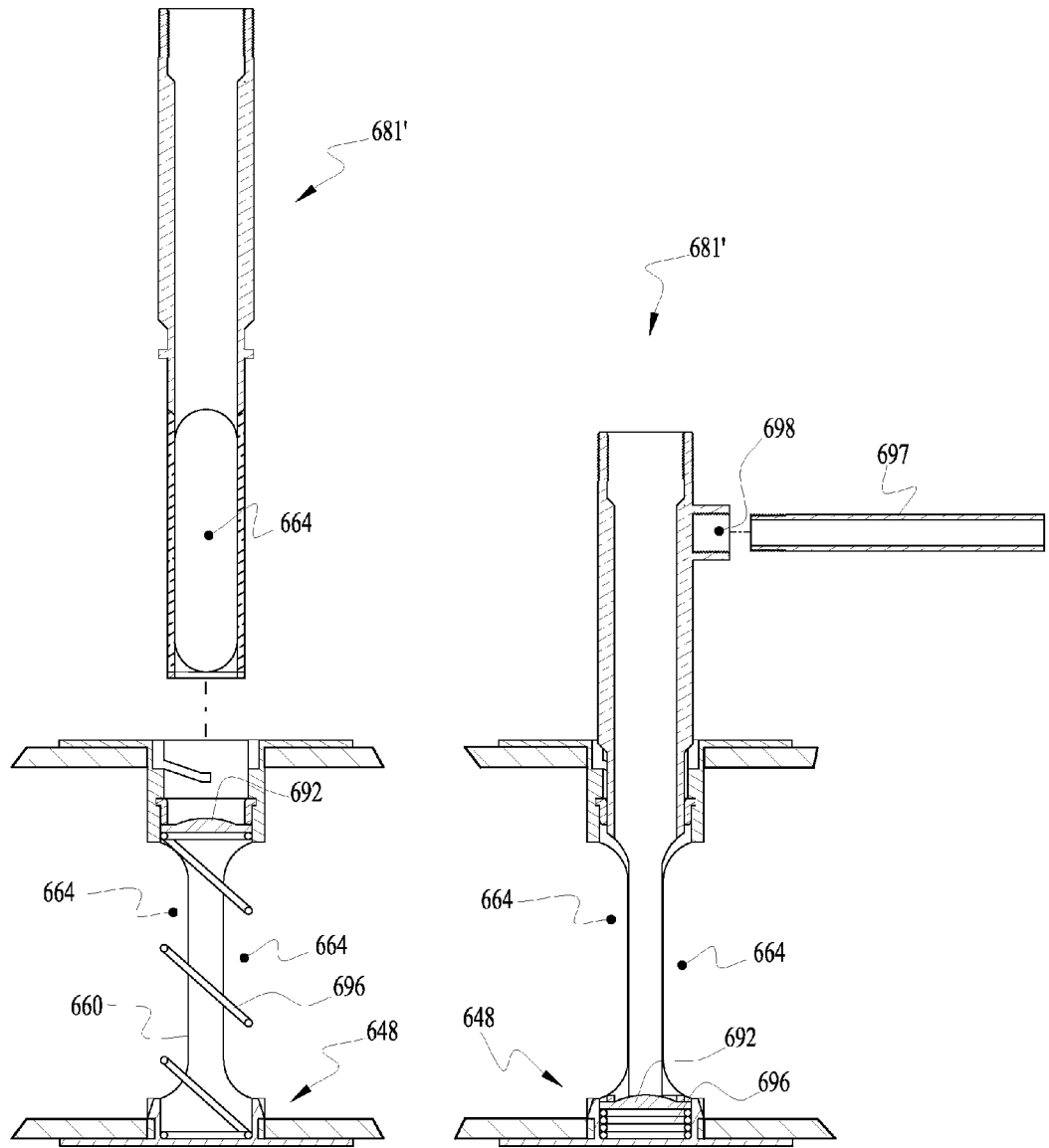

A workable riser for a sprinkler (or other fluid emitter), generally indicated at 681, is structured on one end for bayonet coupling to a sprinkler port 140. With particular reference to FIGS. 8F and 8G, a pair of oppositely disposed lugs 682 are received in cooperating locking slots 684. As the riser end is pressed into the discharge opening 688, the lugs 682 engage slots 684, and are locked in place by a 90 degree rotation of the riser. Insertion of the riser opens normally-closed valve seal member 692. A spring 696 biases the seal toward engagement with a valve seat of the discharge opening 688. Therefore, when the riser 681 is removed, the valve 680 automatically reseals to resist leaking from its associated sprinkler port 140.

When a riser 681 is installed, fluid inside the fluid deliver conduit (typically a lateral) can flow through an opening 700 (see FIG. 8B) for irrigation discharge through opening 688. Desirably, one or more side-wall opening 664 is also, or alternatively, included. In preferred embodiments, a side-wall opening 664 is included on both upstream and downstream sides of both a riser 681 and valve 680 to minimized pressure drop due to presence of valves 680 and associated riser structure inside the hydraulic cross-section 624 of an extended length of fluid delivery conduit.

As shown best in FIG. 8G, a handle 697 may be included to facilitate installation of a riser 681. Illustrated handle 697 is structured for removable coupling with socket 698. In an alternative arrangement, a handle may be a permanent part of a riser.

A modified version (illustrated in FIGS. 8H-L), of an internally disposed quick connect valve 680 includes crosschannel stabilizing structure, generally 644. The illustrated embodiment is structured for snap-together installation of cooperating finger and socket structure, generally indicated at junction 648, to form a fluid-tight connection with the fluid supply conduit.

It may be noted, from inspection of the structures illustrated in this disclosure, that elements from one embodiment may be extracted and incorporated into other embodiments. For example, a connection to a conduit may include element(s) selected from any of the illustrated or described elements (such as barbs, threads, adhesive, fastening such as welding, and the like, as well as additional optional elements such as an O-ring or other seal-reinforcing structure, adhesive or sealant) for any of the embodiments described and/or contemplated in this disclosure. Again, similar elements between different embodiments are generally designated with similar numerals.

A third exemplary type of sprinkler port 140 includes an internally-disposed pop-up riser valve. FIGS. 9A-L are various cross-section views taken through a centerline of exemplary sprinkler ports 140. An exemplary embodiment of such an internally-disposed pop-up riser valve is indicated generally at 740 in e.g. FIG. 9A. One or more telescopically slidable segment 744 is normally disposed inside the hydraulic cross-section of a conduit. Also, certain anchoring structure, such as a barb fitting 602, may be disposed inside the hydraulic cross-section 624. Similar to the previously described internally-disposed embodiments 600 and 680, anchoring structure for the pop-up riser valve 740 can be affixed to one wall of a conduit (e.g. FIGS. 9A-F), or may include a cross-channel stabilizer 644 (e.g. FIGS. 9G-L). All embodiments of a pop-up riser valve 740 according to certain principles of the invention include one or more element that is/are normally-disposed inside the hydraulic cross section 624 of a conduit.

Figure 9M:
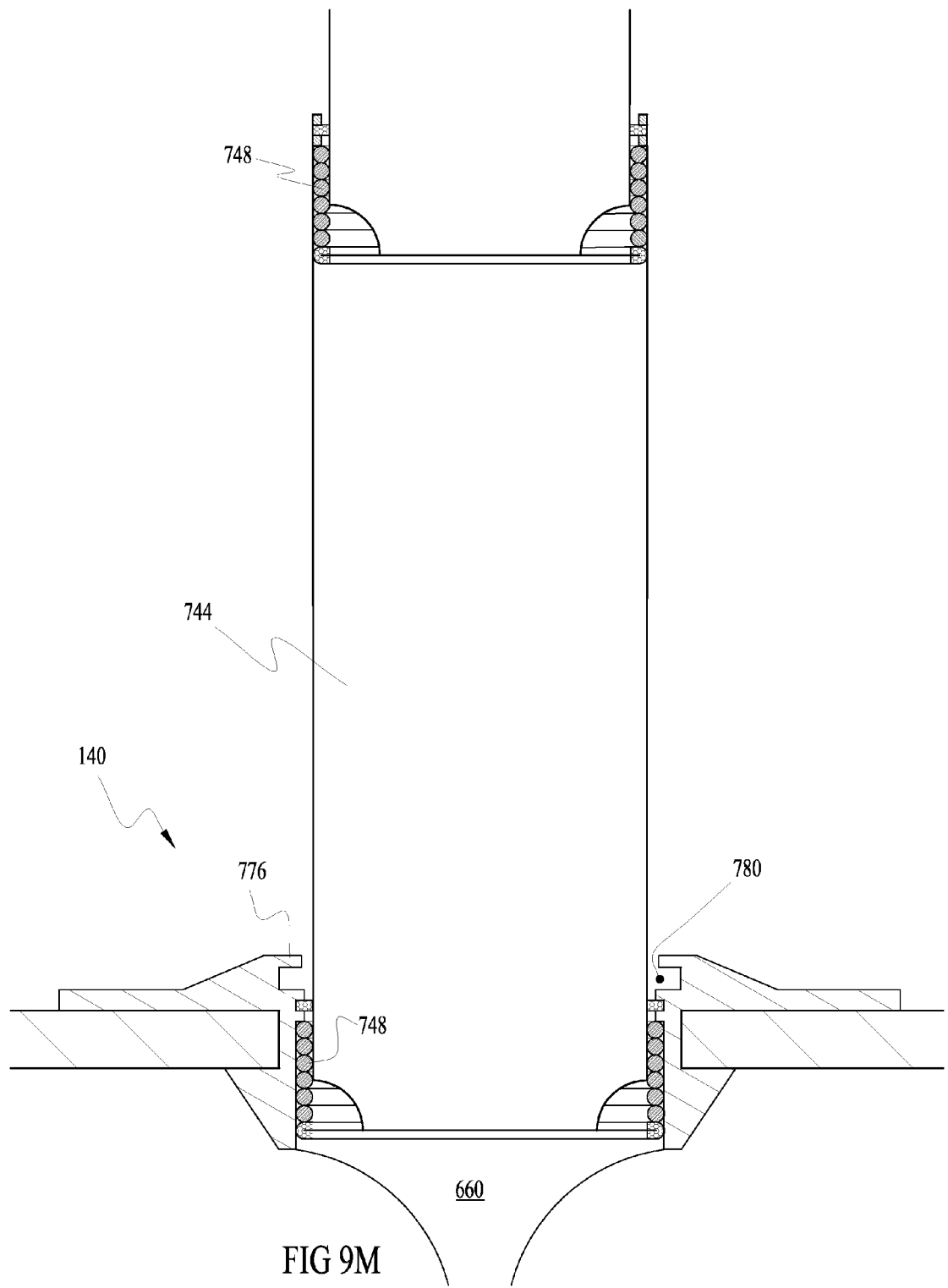

In accordance with operation and construction of certain externally-mounted sprinklers, pressurized fluid in the conduit can cause a slidable segment 744 to "pop-up" out of the conduit, and allow fluid to be applied to an area for irrigation. Some sort of biasing element, such as a compression spring 748 (e.g. FIG. 9M), is disposed to urge return of a pop-up element 744 toward a stowed position inside the conduit. It is within contemplation to alternatively provide a resilient element, (similar to a bungee cord or rubber band, not illustrated), that is placed further into tension as a pop-up riser element 744 is deployed.

Sometimes, it is desired that a pop-up riser valve 740 not be deployable to a popped-up position, even if the conduit is fully pressurized. It may be desirable for no water to escape from one or more sprinkler port 140. For example, part of a fluid supply conduit may be coiled on a storage device, such as a spool 110, and irrigation from part or all of the uncoiled portion is desired. Recall that desirably, a water source may be applied to either end of the conduit. Water escape from the coiled portion, and potentially from a segment of the deployed portion, is typically not desired. Therefore, certain embodiments include sealing structure, generally 760.

Details of a preferred sealing structure 760 for an internally-disposed pop-up riser valve 740 are illustrated in FIGS. 9M-Q. A riser cap 764 includes a rim 768 interrupted around its perimeter by a pair of notches 772. When oriented as shown in FIGS. 9P and 9Q, notches 772 align with fingers 776, and permit both deployment and full retraction of the cap 764. When the cap 764 is fully retracted, it may be rotated about the length axis or centerline of a riser element 744 to place a portion of rim 768 in an entrapped position in space 780 under a finger 776 (see FIGS. 9M-O). Desirably, when the cap 764 is disposed in an entrapped position, no fluid can escape from the associated sprinkler port 140.

While the invention has been described in particular with reference to certain illustrated embodiments, such is not intended to limit the scope of the invention. The present invention may be embodied in other specific forms without departing from its spirit or essential characteristics. The described embodiments are to be considered as illustrative and not restrictive. The scope of the invention is, therefore, indicated by the appended claims rather than by the foregoing description. All changes which come within the meaning and range of equivalency of the claims are to be embraced within their scope.

TABLE 1

| Standard Product | Length (mi) | ID (in) | OD (in) | SDR | Core r (in) | Spool R (in) | Spool D (ft) | Spool W (in) | Raps/ Layer | Layers | Stl Stk | Pmax (psi) | MRKT % |
|---|---|---|---|---|---|---|---|---|---|---|---|---|---|
| 1.5 × 330 | +111⁄16 | 1.5 | 1.73 | 15.25 | 26.0 | 32.0 | 5.3 | 34 | 9 | 3.0 | .75" | 75 | 2% |
| 2 × 660 | 1⁄8 | 2.0 | 2.30 | 15.25 | 35.0 | 48.0 | 8.0 | 34 | 6 | 5.0 | 1" | 75 | 8% |
| 3 × 1320 | 1⁄4 | 3.0 | 3.45 | 15.25 | 52.0 | 62.0 | 10.3 | 52 | 14 | 4.0 | 1.5" | 75 | 65% |
| 4 × 2640 | 1⁄2 | 4.0 | 4.61 | 15.25 | 69.0 | 92.0 | 15.3 | 104 | 21 | 4.0 | 2" | 75 | 20% |
| 4.5 × 2640 | 1⁄2 | 4.5 | 5.18 | 15.25 | 78.0 | 102.0 | 17.0 | 104 | 19 | 4.0 | 2" | 75 | 5% |

What is claimed is:

1. A method for irrigating an area, comprising:
providing a fluid conduit coiled on a spool, said conduit comprising a plurality of sprinkler ports disposed spaced apart along a length axis of said conduit, each sprinkler port of said plurality of sprinkler ports comprising an affixed connection structure operable to removably connect, removably quick-connect, or quick-deploy a riser, a portion of said connection structure, comprising a pair of oppositely-disposed side wall openings structured to permit hydrodynamic flow-through during sprinkler operation, being disposed inside a hydraulic cross-section of said conduit;
uncoiling a length of said conduit to dispose said length of conduit as a line across said area; and
using said conduit to irrigate said area as desired; wherein:
said conduit is structured and arranged to permit operable partial deployment of said conduit without leaking during irrigation such that said length of said conduit may encompass less than all of the total length of conduit coiled on said spool and such that a subset of said plurality of sprinkler ports that is disposed in conduit remaining on said spool does not leak during said irrigation; and
labor to deploy said length of conduit is reduced compared to use of a plurality of lengths of rigid conduit segments that are coupled end-to-end during deployment for irrigation.

2. The method according to claim 1, further comprising:
removing said length of conduit from said area by coiling said length of conduit onto said spool to permit re-deployment of said conduit to irrigate an area.

3. The method according to claim 2, further comprising:
coupling a winding apparatus to said spool; and
using said winding apparatus to wind up said length of conduit onto said spool to retrieve said length of conduit from said area.

4. The method according to claim 3, wherein:
said winding apparatus remains at an edge of said area while winding conduit onto said spool.

5. The method according to claim 3, wherein:
said winding apparatus travels across said area while winding conduit onto said spool.

6. The method according to claim 1, wherein:
each sprinkler port of said plurality of sprinkler ports is associated with a cross-channel stabilizer.

7. The method according to claim 1, wherein: each sprinkler port of said plurality of sprinkler ports comprises a pop-up riser, a portion of said pop-up riser being biased for disposition inside said hydraulic cross-section of said conduit.

8. The method according to claim 7, wherein: the pop-up riser of each sprinkler port of said plurality of sprinkler ports further comprises valve structure operable to resist discharge of fluid there-through to permit control of fluid flow through its associated sprinkler port.

9. The method according to claim 1, wherein: each sprinkler port of said plurality of sprinkler ports comprises an affixed threaded socket structured to couple with an end of a threaded riser, a portion of said threaded socket protruding into said hydraulic cross-section of said conduit.

10. The method according to claim 1, wherein:
reinforcement structure to locally reinforce each sprinkler port of said plurality of sprinkler ports is configured to protrude above a local exterior surface of said conduit by less than a local thickness of a wall of said conduit.

11. The method according to claim 1, wherein:
reinforcement structure to locally reinforce each sprinkler port of said plurality of sprinkler ports is configured to protrude above the surface of said conduit by less than about 1⁄8 inch.

12. The method according to claim 1, wherein:
an exterior surface of a hydraulic cross-section of said conduit is structured to interface with a horizontal surface onto which said conduit is deployed to automatically align all deployed sprinkler ports for discharge in a substantially common vertical direction upon deployment of said length of conduit as said line and during use of deployed conduit for irrigation.

13. The method according to claim 1, further comprising:
disposing said spool at an edge of said area and on a rolling support structured to engage rim portions of said spool to permit unspooling said length of conduit from said spool; and
dragging a free end of said conduit to unspool said length of conduit from said spool and dispose said length of conduit in said field.

14. A method for irrigating an area, comprising:

providing a fluid conduit coiled on a spool, said conduit comprising a plurality of sprinkler ports disposed spaced apart along a length axis of said conduit, each sprinkler port of said plurality of sprinkler ports comprising an affixed connection structure operable to removably quick-connect, or quick-deploy a riser, a portion of said connection structure being disposed inside a hydraulic cross-section of said conduit;

uncoiling a length of said conduit to dispose said length of conduit as a line across said area; and using said conduit to irrigate said area as desired; wherein:

said conduit is structured and arranged to permit operable partial deployment of said conduit without leaking during irrigation such that said length of said conduit may encompass less than all of the total length of conduit coiled on said spool and such that sprinkler ports disposed in conduit remaining on said spool do not leak during said irrigation; and labor to deploy said length of conduit is reduced compared to use of a plurality of lengths of rigid conduit segments that are coupled end-to-end during deployment for irrigation; wherein:

each sprinkler port of said plurality of sprinkler ports comprises a quick-connect with a valve seal member being disposed inside said hydraulic cross-section, wherein:

said quick-connect valve is a spring-biased bayonet quick-connect valve.

15. The method according to claim 14, wherein:

an internal quick-connect valve is structured to operate as a normally-closed check valve.

16. A method for irrigating an area, comprising:

providing a fluid conduit coiled on a spool, said conduit comprising a plurality of sprinkler ports disposed spaced apart along a length axis of said conduit, each sprinkler port of said plurality of sprinkler ports comprising quick-connect structure having a normally-closed valve, said quick-connect structure being configured to couple with a riser structured to open said valve upon coupling said riser to said quick-connect structure and thereby permit fluid flow toward a fluid emitter, a wetted portion of said quick-connect structure, comprising a pair of oppositely-disposed side wall openings structured to permit hydrodynamic flow-through during sprinkler operation, being disposed inside a hydraulic cross-section of said conduit;

deploying a length of said conduit to dispose said length of conduit as a line across said area; and using said conduit to irrigate said area as desired.

17. A method for irrigating an area, comprising:

providing a fluid conduit coiled on a spool, said conduit comprising a plurality of sprinkler ports disposed spaced apart along a length axis of said conduit, each sprinkler port of said plurality of sprinkler ports comprising a cross-channel stabilizer disposed inside a hydraulic cross-section of said conduit, each said cross-channel stabilizer comprising a leg spanning between a first anchor and a second anchor spaced apart from each other across the respective hydraulic cross-section of said fluid conduit and a pair of oppositely-disposed side wall openings structured to permit hydrodynamic flow-through during sprinkler operation, each sprinkler port further comprising a normally-closed valve with a valve seal member disposed in the hydraulic cross-section of said conduit;

uncoiling a length of said conduit to dispose said length of conduit as a line across said area; and using said conduit to irrigate said area as desired.

18. The method according to claim 17, wherein: each sprinkler port of said plurality of sprinkler ports is associated with the normally-closed valve that is opened by quick-connection of a riser thereto.

19. The method according to claim 17, further comprising: a pop-up riser associated with each sprinkler port of said plurality of sprinkler ports.

\* \* \* \* \*